United States Patent
Tsuboka et al.

[11] Patent Number: 6,061,652
[45] Date of Patent: May 9, 2000

[54] SPEECH RECOGNITION APPARATUS

[75] Inventors: Eiichi Tsuboka, Neyagawa; Junichi Nakahashi, Nara, both of Japan

[73] Assignee: Matsushita Electric Industrial Co., Ltd., Osaka, Japan

[21] Appl. No.: 08/596,305

[22] PCT Filed: Jun. 9, 1995

[86] PCT No.: PCT/JP95/01154

§ 371 Date: Jun. 18, 1996

§ 102(e) Date: Jun. 18, 1996

[87] PCT Pub. No.: WO95/34884

PCT Pub. Date: Dec. 21, 1995

[30] Foreign Application Priority Data

Jun. 13, 1994 [JP] Japan .................................. 6-130023
Apr. 26, 1995 [JP] Japan .................................. 7-102665

[51] Int. Cl.$^7$ ................................ G10L 5/06; G10L 9/00
[52] U.S. Cl. ................................. 704/245; 382/225
[58] Field of Search ............................ 395/2.54; 382/225

[56] References Cited

U.S. PATENT DOCUMENTS

| | | | |
|---|---|---|---|
| 4,570,232 | 2/1986 | Shikano | 704/232 |
| 4,829,577 | 5/1989 | Kuroda et al. | 381/45 |
| 5,040,215 | 8/1991 | Amano | 704/232 |
| 5,050,215 | 9/1991 | Nishimura | 381/41 |
| 5,058,166 | 10/1991 | Ney et al. | 381/43 |
| 5,129,002 | 7/1992 | Tsuboka | 381/43 |
| 5,263,120 | 11/1993 | Bickel | 704/245 |
| 5,307,444 | 4/1994 | Tsuboka | 704/256 |
| 5,608,841 | 3/1997 | Tsuboka | 395/2.65 |

FOREIGN PATENT DOCUMENTS 63-250698 10/1988 Japan .

OTHER PUBLICATIONS

E. Tsuboka et al., "On the Multiplication Type FVQ/HMM", Technical Report of IEICE, SP–93–27 Jun. 1993), pp. 25–31.
Japanese language search report dated Sep. 19, 1995.
English translation of Japanese language search report.

(List continued on next page.)

*Primary Examiner*—David R. Hudspeth
*Assistant Examiner*—Robert Louis Sax
*Attorney, Agent, or Firm*—Ratner & Prestia

[57] ABSTRACT

A HMM device, and a DP matching device, capable of performing word spotting accurately with a small amount of calculation is provided. For that purpose, a code book is provided in which representative vectors of respective clusters are stored in a form searchable by their labels, wherein in HMM, similarity degrees based on Kullbach-Leibler Divergence of distributions of occurrence probabilities of the clusters under respective states and distribution of degrees of input feature vectors to be recognized to the respective clusters are rendered occurrence degrees of the feature vectors from the states and in DP matching, similarity degrees based on Kullbach-Leibler Divergence of distributions of membership degrees of feature vectors forming reference patterns to the respective clusters and distribution of degrees of input feature vectors to the respective clusters are rendered inter-frame similarity degrees of frames of the input patterns and frames of corresponding reference patterns.

30 Claims, 15 Drawing Sheets

OTHER PUBLICATIONS

El Gamal A., et al, Using Simulated Annealing to Design Good Codes, IEEE Trans. Info. Theory vol. IT–33 No. 1, pp. 116–123, Jan. 1987.

Liu L., et al, Segment Matrix Vector Quantization and Fuzzy Logic for Isolated–word Speech Recognition, IEEE ISCS, pp. 152–156, Jun. 11, 1991.

Gersho, A., Gray R. M., Vector Quantization and Signal Compression, Kluwer, pp. 362–372, Dec. 1991.

Marques F., Kuo C–C, Classified Vector Quantization using Fuzzy Theory, IEEE ICFS, pp. 237–244, Mar. 1992.

Tsuboka E., Nakahashi J., On the Fuzzy Vector Quantization based Hidden Markov Model, ppl–637–640, Apr. 1994.

Cong L., et al, Combining Fuzzy Vector Quantization and Neural Network Classification for Robust Isolated Word Speech Recognition, Proceedings of ICCS, pp. 884–887, Nov. 1994.

Ho–Ping Tseng et al., "Fuzzy Vector Quantazation Applied to Hidden Markov Modeling", CH2396–0/87/0000–0641 IEEE, at 641–644 (1987).

Sugiyama, Masahide, "Automatic Language Recognition Using Acoustic Features," CH2977–7/91/0000–0813, IEEE, pp. 813–816 dated May 1991.

State or frame →

| 1 | 2 | | $J^{(r)}$ |
|---|---|---|---|
| $b^{(r)}_{1,g(r,1,1)}$ | $b^{(r)}_{2,g(r,2,1)}$ | | $b^{(r)}_{J^{(r)},g(r,J^{(r)},1)}$ |
| $b^{(r)}_{1,g(r,1,2)}$ | $b^{(r)}_{2,g(r,2,2)}$ | | $b^{(r)}_{J^{(r)},g(r,J^{(r)},2)}$ |
| ⋮ | ⋮ | | ⋮ |
| $b^{(r)}_{1,g(r,1,N)}$ | $b^{(r)}_{2,g(r,2,N)}$ | | $b^{(r)}_{J^{(r)},g(r,J^{(r)},N)}$ |

FIG. 21

State or frame →

| 1 | 2 | | $J^{(r)}$ |
|---|---|---|---|
| $b^{(r)}_{1,g(r,1,1)}$ | $b^{(r)}_{2,g(r,2,1)}$ | | $b^{(r)}_{J^{(r)},g(r,J^{(r)},1)}$ |
| $b^{(r)}_{1,g(r,1,2)}$ | $b^{(r)}_{2,g(r,2,2)}$ | | $b^{(r)}_{J^{(r)},g(r,J^{(r)},2)}$ |
| ⋮ | ⋮ | | ⋮ |
| $b^{(r)}_{1,g(r,1,N)}$ | $b^{(r)}_{2,g(r,2,N)}$ | | $b^{(r)}_{J^{(r)},g(r,J^{(r)},N)}$ |
| $\exp[B^{(r)}_1]$ | $\exp[B^{(r)}_2]$ | | $\exp[B^{(r)}_{J(r)}]$ |

FIG. 22

State or frame →

| 1 | 2 | | T |
|---|---|---|---|
| $U_{1,h(1,1)}$ | $U_{2,h(2,1)}$ | | $U_{T,h(T,1)}$ |
| $U_{1,h(1,2)}$ | $U_{2,h(2,2)}$ | | $U_{T,h(T,2)}$ |
| ⋮ | ⋮ | ⋮ | ⋮ |
| $U_{1,h(1,N)}$ | $U_{2,h(2,N)}$ | | $U_{T,h(T,N)}$ |

FIG. 23

State or frame →

| 1 | 2 | | T |
|---|---|---|---|
| $U_{1,h(1,1)}$ | $U_{2,h(2,1)}$ | | $U_{T,h(T,1)}$ |
| $U_{1,h(1,2)}$ | $U_{2,h(2,2)}$ | | $U_{T,h(T,2)}$ |
| ⋮ | ⋮ | ⋮ | ⋮ |
| $U_{1,h(1,N)}$ | $U_{2,h(2,N)}$ | | $U_{T,h(T,N)}$ |
| $\exp[C_1]$ | $\exp[C_2]$ | | $\exp[C_T]$ |

FIG. 24

SPEECH RECOGNITION APPARATUS

FIELD OF THE INVENTION

The present invention relates to a speech recognition apparatus such as a speech recognition device.

BACKGROUND OF THE INVENTION

There is a known method of using HMM (Hidden Markov Model) or DP (Dynamic Programming) matching for speech recognition. Both these methods are frequently used as basic technologies of speech recognition, an important problem in these systems for realizing expansion of vocabulary or continuous speech recognition and the like is to reduce the amount of calculation without deteriorating their functions. A method using vector quantization has already been proposed as a method of solving the problem. The present application concerns its improvement. Before entering the subject an explanation will first be given generally of HMM and DP matching and of how the technology of vector quantization is used.

HMM is considered to be a model for generating time-sequential signals in accordance with a stochastic property. In speech recognition using HMM, HMM r is provided in correspondence with a recognition unit $r(=1,\ldots,R)$ such as a word, a syllable, a phoneme or the like (hereinafter, representatively word) to be recognized. When a vector series $Y=(Y_1, Y_2, \ldots, Y_T)$ ($y_t$: a vector observed at a time point t) is observed, a degree of occurrence of Y is calculated from each HMM r and a word which corresponds to a HMM having the maximum degree is rendered the result of recognition.

FIG. 1 shows an example of HMM circle mark ○ designates a state of a system to be modeled by HMM, an arrow mark → designates a direction of transition of a state and $q_i$ designates a state i. Assume that a transition from a state i to a state j is caused by a probability $a_{ij}$. The model is called a Markov chain when only a state and its transition probability are defined. By contrast, in HMM, a vector is assumed to generate on each state transition and $\omega_{ij}(y)$ is defined as a degree of occurrence of a vector y in accordance with a state transition $q_i \to q_j$. There also are many cases expressed in $\omega_{ij}(y)=\omega_{ii}(y)$ $\omega_i(y)$ or $\omega_{ij}(y)=\omega_{jj}(y)=\omega_j(y)$ in which y occurs not in accordance with state transition but with state. An explanation will be given in this application assuming that y occurs in accordance with state. Here, the structure of HMM, state transition probability and an occurrence probability of a vector are determined such that behavior of an object (speech pattern such as a word when used in speech recognition) to be modeled by HMM is explained as correctly as possible. FIG. 2 is an example of a constitution of HMM which is frequently used in speech recognition.

When HMM is defined, a degree $L(Y|\lambda)$ whereby an observation vector series Y occurs from a model (designated by $\lambda$) and can be calculated as follows.

$$L(Y|\lambda) = \sum_x \pi x_1 \prod_{t=1}^{T} ax_t x_{t+1} \prod_{t=1}^{T} \omega x_t(y_t) \qquad \text{(Equation 1)}$$

where $X=(X_1, X_2, \ldots, X_{T+1})$ designates a state series and $\pi_1$ designates a probability of being in state i at t=1. In this model $x_t \in \{1, 2, \ldots, J, J+1\}$ and $x_{T+1}=J+1$ is a final state. In the final state only a transition thereto occurs and there is no occurrence of vector.

HMM is grossly classified into a continuous type and a discrete type. In the continuous type, $\omega_i(y)$ is a continuous function such as a probability density function of y in which a degree of occurrence of $y_t$ is given as a value of $\omega_i(y)$ when $y=y_t$. A parameter specifying $\omega_i(y)$ for each state i is defined and the degree of occurrence of $y_t$ at a state i is calculated by substituting $y_t$ into $\omega_i(y)$. For example, when $\omega_i(y)$ is given by a normal distribution of multiple dimensions, $$\omega_i(y)=N(y;\mu i,\Sigma i) \qquad \text{(Equation 2)}$$

where parameters of the function specified by the state i are $\mu i$ and $\Sigma i$.

In the discrete type, an occurrence probability $b_{im}$ of a label $m \in \{1, 2, \ldots M\}$ into which $y_t$ is to be transformed by vector quantization is stored in a table for each state i. The degree of occurrence of $y_t$ in the state i is $b_{im}$ when the label into which $y_t$ is transformed is m.

The vector quantization is performed by using a code book. In the code book, when the size is defined as M, feature vectors collected as learning samples are clustered into clusters of $1, 2, \ldots, M$ and representative vectors (also designated as average vector, centroide, code vector etc.) $\mu m$ of clusters $m (=1, 2, \ldots, M)$ are stored is a searchable form. The L.B.G. Algorithm is a well known clustering method. The vector quantization of $y_t$ is performed by transforming $y_t$ into a label of centroide most proximate thereto. Accordingly, the degree of occurrence of $y_t$ at the state i is given by the following equation.

$$\omega_i(y_t) = b_i o_t \text{ where } o_t = \min_m [d(y_t, \mu_m)] \qquad \text{(Equation 3)}$$

$d(y_t, \mu m)$ is a distance between $y_t$ and $\mu m$ where various distances are considered as including an Euclidean distance.

FIG. 3 is a block diagram of a speech recognition device using a discrete type HMM. A feature extraction unit 301 transforms input speech signals into feature vectors at constant intervals of time (designated as frame), for example, at every 10 msec by a well-known method such as a filter bank, Fourier transformation, LPC analysis etc. Accordingly, the input voice signals are transformed into a series of feature vectors $Y=(y_1, y_2, \ldots y_T)$. T designates a number of frames. A code book 302 holds representative vectors, each corresponding to each label in a form searchable by the label. A vector quantizing unit 303 substitutes (encode) each vector of the vector series Y into a label nearest thereto which corresponds to a representative vector registered in the code book. A parameter estimation unit 304 estimates, from learning samples, parameters of HMM corresponding to respective words of a recognition vocabulary. That is, in forming a HMM corresponding to a word r, the structure (number of states and its transition rule) of HMM is suitably determined first. Thereafter, the state transition probability or the occurrence probability of the label occurring in accordance with the state in the above-mentioned model is calculated in a manner that the occurrence degree of the label series obtained from pronouncing a word r a number of times becomes as high as possible. A HMM storing unit 305 stores HMMs provided thereby for respective words. A likelihood calculation unit 306 calculates the likelihood of the label series of unknown input speech, which should be recognized, for the above-mentioned label series of respective models stored in the HMM unit 305. A determination unit 307 determines the correspondence of a word to a model providing a maximum value of the likelihood of the above-mentioned respective model obtained by the likelihood calculation unit 306. In FIG. 3 broken lines designate the flow of signals in forming HMMs.

In the continuous HMM, the degrees of occurrence of observation vectors in respective states are given by the defined probability density function. This presents a problem wherein a large amount of calculation is necessary although the accuracy is higher than that in the discrete type. In contrast, in the discrete type HMM, there is an advantage as the amount of calculation necessary is very small and since the calculation of likelihood of a model with respect to the observation label series can be executed by reading the occurrence probabilities $b_{im}$ of the labels m(=1, . . . ,M) at respective states from a storing device storing them in relation to the labels. However, there is a drawback wherein the recognition accuracy is worse than that in the continuous type HMM due to an error associated with the quantization. To avoid this error it is necessary to increase the number of labels M (enlarge the size of the code book). However, with the increase, the number of learning samples necessary to obtain the model becomes very large. When the number of learning samples is insufficient, the estimated value of the above-mentioned $b_{im}$ may frequently be 0, with which a correct estimation cannot be performed.

For example, consider a case where there is a word speech pronouncing "Osaka" in the above-mentioned recognition vocabulary, and a model corresponding thereto is formed. Speech samples corresponding to the word "Osaka" pronounced by a number of speakers are transformed into a feature vector series and respective feature vectors are transformed into labels as mentioned above. In this way the respective speech samples with respect to the above-mentioned word "Osaka" are transformed into a label series corresponding thereto. A discrete type HMM corresponding to the word "Osaka" is formed from the obtained labels series by estimating the parameters $\{a_{ij}, b_{im}\}$ of a HMM such that the likelihood with respect to these label series is maximized. The well-known Baum-Welch method or the like can be used in the estimation.

In this case all the labels existing in the code book are not always included in the label series of the learning samples corresponding to the word "Osaka". The occurrence probability of a label which does not appear in the label series of the learning sample is estimated to be "0" in the procedure of learning in the model corresponding to "Osaka." Accordingly, in a case in which a label that is not included in the label series used in forming the above-mentioned model of "Osaka" happens to be present in the label series corresponding to the word voice of "Osaka" pronounced at recognition time (this is sufficiently probable when the number of learning samples is small), the degree of occurrence of the label series of "Osaka" pronounced at recognition time from the above-learned model of "Osaka" becomes "0". However, even in such a case, although the label is different, as the feature vectors are considerably close to those of the voice samples used in learning the model before transforming into the labels, they should be recognized sufficiently as "Osaka" in the stage of vectors. Originally both vectors should resemble each other since the same word is pronounced. However it is sufficiently probably that, when these vectors with a small difference are in the vicinity of a boundary of a cluster of the labels, they are transformed into totally different labels. It is easily imaginable that such a matter adversely influences recognition accuracy. The larger the size M of the code book and the smaller the number of learning samples, the more frequently such a problem is caused.

One method for removing the drawback is a HMM based on fuzzy vector quantization, which we call FVQ/HMM. A multiplication type FVQ/HMM described in the Institute of Electronics, Information and Communication Engineers Technical Report SP93-27 (June, 1993) is worthy of notice as one showing excellent capability.

FIG. 4 is a block diagram explaining a general principle of FVQ/HMM. In the figure, broken lines show a flow of signals in forming HMM. A feature extraction unit 401 is similar to the part 301 in FIG. 3. A code book 402 is similar to the part 302 in FIG. 3. A membership degree calculation unit 403 transforms the feature vectors into membership degree vectors. The membership degree vector is a vector which has an element of a membership degree of the feature vector at each time point with respect to each cluster. Defining the feature vector at a time point t as $y_t$, the above-mentioned clusters as $C_1, \ldots, C_M$ and the membership degree of $y_t$ with respect to $C_m$ as $u_{tm}$, $y_t$ is transformed into the membership degree vector $u_t = (u_{t1}, \ldots, u_{tM})^T$. Hereinafter, in this application a vector is a column vector and T at superscript designates transpose. Various definitions may be considered for $u_{tm}$, for example, it may be defined as follows. (J. G. Bezdec: "Pattern Recognition with Fuzzy Objective Function Algorithm", Plenum Press, New York (1981).)

$$u_{tm} = 1 \bigg/ \sum_n [d(y_t, \mu_m)/d(y_t, \mu_n)]^{2/(F-1)} \quad \text{(Equation 4)}$$

In this equation F>1 and designates fuzziness defined as follows.

$$(1) \; F \to 1 \Rightarrow u_{tm} \to \delta_{o_t m}\left(o_t = \underset{k}{\operatorname{argmax}}[d(y_t, \mu_m)]\right) \quad \text{(Equation 5)}$$

$$(2) \; F \to \infty \Rightarrow u_{tm} \to \frac{1}{M}$$

where $\delta_{ij}$ is the Kronecker delta in which $\delta_{ij}=1$ if i=j and $\delta_{ij}=0$ if i≠j. Equation 5 signifies that, if the label of a cluster corresponding to a centroid that is nearest to $y_t$ is designated as $O_t$, a membership degree of $y_t$ to the cluster is 1. Membership degrees thereof to the other clusters are 0 when F→1 (which becomes a normal vector quantization.) When F→∞, the membership degrees of $y_t$ to any clusters are 1/M which maximizes the fuzziness. When a posterior probability of $C_m$ with respect to $y_t$ can be calculated by a means such as a neural net or others, the posterior probability can be rendered the definition of the membership degree (hereinafter, both "posterior probability" and "membership degree" are designated as "membership degree").

In fact, the above-mentioned membership degree $u_{tm}$ is not calculated for all the clusters for reasons mentioned later, but the calculation is performed with respect to a cluster having a minimum $d(y_t, \mu m)$ to a K-th smallest cluster (K-nearest neighbor). That is, the elements forming the above-mentioned membership degree vector $u_t$ have values calculated by Equation 4 with respect to clusters of higher orders K having larger membership degrees and] all other values are rendered 0. Numeral 404 designates a parameter estimation unit. A HMM storing unit 405 stores HMMs, each HMM corresponding to each recognition unit such as a word or a syllable to be recognized. A likelihood calculation unit 406 calculates a likelihood with respect to input speech of the above-mentioned respective HMM from the membership degree vector series, provided from an output of the above-mentioned vector quantization unit. That is, a degree $L^r$ of occurrence of feature vector series $y_1, \ldots, y_T$ from the above-mentioned HMM r(r=1, . . . ,R). A determination unit 407 calculates the following equation with r* as a recognition result.

$$r^* = \underset{r=1,\ldots,R}{\mathrm{argmax}}\,[L^r]. \qquad \text{(Equation 6)}$$

The likelihood calculation unit 406 calculates the likelihood $L^r$ corresponding to the recognition unit r with respect to r=1, . . . ,R in accordance with Equation 1. Then various HMMs are defined in accordance with the above-mentioned definition of $\omega_i(y_t)$. In the multiplication type FVQ/HMM shown here $\omega_i(y_t)$ is defined as follows.

$$\log \omega_i(y_t) = \sum_m u_{tm} \log b_{im} \qquad \text{(Equation 7)}$$

In a multiple form, $$\omega_i(y_t) = \prod_m b_{im}^{u_{tm}}$$

As mentioned above, addition or multiplication with respect to m in Equation 7 is performed only with regard to K clusters having higher orders of membership degrees; in this case, Equation 7 becomes the following Equation 8. (hereinafter, explanation will be given of addition style)

$$\log \omega_i(y_t) = \sum_{k=1}^{K} u_{t,h(k)} \log b_{i,h(k)} \qquad \text{(Equation 8)}$$

where h(k) designates a cluster in which $y_t$ has a k-th highest membership degree. When the membership degree is defined by Equation 4, Equation 4 is calculated with regard to up to a k-th $d(y_t, \mu m)$ in an order of smallness. In this case, $u_{t,h(1)} + \ldots + u_{t,h(K)} = 1$, and $u_{t,h(K+1)} = \ldots = u_{t,h(M)} = 0$. The addition in Equation 7 is performed only for K clusters having higher order membership degrees as in Equation 8 not only for reducing the amount of calculation but also for the following reason.

The FVQ type shows a higher recognition rate than the discrete type because of an interpolation effect of learning samples in estimating parameters. For example, consider a case where probabilities of occurrence of cluster A and cluster B in a state i is estimated by learning samples. In the discrete type, a vector to be quantized is classified to A even if it is near to B when it is on the side of A with little distance from the boundary, and to B when it is on the side of B with little distance therefrom. Accordingly, even if A and B are included in a population with the same rate, there is a segregation in learning samples and many included in A happen to be vectors in the neighborhood of the boundary between A and B. Therefore, it is probable that the probability of occurrence of A is estimated as larger than the probability of occurrence of B. Such a segregation of learning data easily occurs when the number of learning data with respect to the size of a code book is small. The recognition rate deteriorates when the learning samples and evaluation data are independent from each other. This is because the segregation is not necessarily in agreement with the trend of the evaluation data.

In the case of the FVQ type, not only A but B as well is assumed to occur in accordance with the membership degrees of the vectors and the probabilities of occurrence of these are calculated thereby. Therefore, with regard to the above-mentioned learning samples, although the probability of occurrence of A is estimated a little higher, the probability of occurrence of B is also estimated in accordance with the membership degree and an extreme estimation error as in the discrete type is not caused. That is, it can be said that an interpolation is performed with regard to the learning samples by the FVQ type; in other words, the number of learning samples is effectively increased. This is the reason that the recognition rate of the FVQ type is superior to the recognition rate of the discrete type, especially when the size of the code book is large.

The interpolation for the insufficiency of the number of learning samples by the FVQ type signifies that the number of the learning samples are increased equivalenty from the given learning samples per se, it is a little different from an actual increase in the number of the learning samples. Accordingly, it is sufficiently possible that, when the size of the code book decreases, the number of learning samples with regard to each cluster relatively increases and the estimation accuracy of $b_{im}$ is sufficiently improved. The recognition rate of the discrete type without the interpolation becomes higher or equal to that of the FVQ type with poor interpolation, depending on the manner of interpolation.

The degree of the interpolation is influenced by the value of K as well as the size of the code book or the fuzziness. With K approaching K=1, that is, approaching that of the discrete type, the influence of the interpolation becomes small. The influence of the interpolation becomes large with an increase in K. Therefore, the degree of interpolation can be controlled by K when the fuzziness is fixed. That is, an unnecessary increase in K does not necessarily imply improvement. Thus, there is an optimum value for K in accordance with the size of a code book. This optimal value arises in view of maximizing the amount of improvement of the recognition rate by the FVQ type over that of the discrete type. According to experiments, in recognizing 100 city names by an unspecified speaker, the optimum value was K=6 with regard to the size of a code book of 256 and the optimum value was K=3 with regard to the size of a code book of 16.

In this way, in the FVQ type as compared with the discrete type, although K-times calculation of the membership degree and K-times product sum calculation are increased, since it is necessary to calculate Equation 8 at recognition time, the recognition rate is improved compared with that of the discrete type and is equal to or improved compared with that of the case of the continuous type. Further, the amount of calculation is considerably reduced compared to that in the case of the continuous type.

A method called Forward-Backward method is used as a method for calculating Equation 1. However, to reduce the amount of caluation, the Viterbi method for calculating a maximum value with regard to X as an approximate solution of Equation 1 is often used. It is normal practice to use the method in the form of addition by logarithmic calculation.

That is, the calculation is performed by the following equation where L' is likelihood.

$$L' = \max_x \left[ \log \pi x_1 + \sum \log ax_t x_{t+1} + \sum_t \log \omega\, x_t(y_t) \right] \qquad \text{(Equation 9)}$$

Equation 9 can effectively be calculated by the Dynamic Programming method. That is, L' is calculated by the following equations recurrently with respect to t=2, . . . T with $\phi_i(1) = \log \pi_i$.

$$\phi_j(t) = \max_i [\phi_i(t-1) + \log a_{ij} + \log \omega_j(y_{t-1})] \quad \text{(Equation 10)}$$

$$L' = \max_i [\phi_i(T+1)] \quad \text{(Equation 11)}$$

This is called the Viterbi method. Often, in forming a model, the Baum-Welch method (Forward-Backward method) is used and the Viterbi method is used in recognition since there is no significant difference between recognition results using L and L'. In the case of the multiplication type FVQ/HMM, when the Viterbi method is used in recognition, since $b_{im}$ is only used in the form of $\log b_{im}$. By storing not $b_{im}$ but $\log b_{im}$, logarithmic calculation is not necessary and the only product sum calculation can be executed in calculating Equation 7 or Equation 8.

Next, an explanation will be given of DP matching. The most basic method is performed by pattern matching among feature vector series. FIG. 5 shows a conventional example. Numeral 51 designates a feature extraction unit which is similar to the part 301 in FIG. 3. A reference pattern storing unit 53 stores reference patterns corresponding to words. The reference patterns are previously registered in the reference pattern storing unit 53 in correspondence with words to be recognized as ones transformed into feature vector series in the feature extraction unit 51. A broken line in FIG. 5 designates a connection used in the registering. The connection shown by the broken line portion is released at recognition time. A pattern matching unit 52 performs a matching calculation of each reference pattern stored in the reference pattern storing unit 53 with an input pattern and calculates a distance (or similarity degree) between the input pattern and each reference pattern. A determination unit 54 finds a word corresponding to a reference pattern and providing a minimum value (maximum value) of a distance (or similarity degree) between the above-mentioned input pattern and each reference pattern.

A more specific explanation will be given as follows. In this example an explanation will be given of calculating "distance" between patterns. (In a case based on "similarity degree", "distance" is replaced by "similarity degree" and "minimum value" is replaced by "maximum value") Now, assume that a feature vector outputted at a time point t in the feature extraction unit 51 is defined as $y_t$, the input pattern series is defined as $Y=(y_1, y_2, \ldots y_t)$ and a reference pattern corresponding to a word r is defined by the following equation.

$$Y^{(r)} = (y^{(r)}_1, y^{(r)}_2, \ldots, y^{(r)}_J) \quad \text{(Equation 12)}$$

Further, assume that a distance from Y to $Y^{(r)}$ is defined as $D^{(r)}$ and a distance between $y_t$ and $y^{(r)}_j$ is defined as $d^{(r)}(t,j)$ (however, in the multiplication style the respectives are designated by $D_2^{(r)}$ and $d_2^{(r)}(t,j)$ and in addition style the respectives are designated by $D_1^{(r)}$ and $d_1^{(r)}(t,j)$. The following equations are calculated.

$$X^* = \underset{x}{\operatorname{argmin}} \left[ \sum_{k=1}^{K} w(x(k)) d_1^{(r)}(x(k)) \right] \ldots (a) \quad \text{(Equation 13)}$$

$$D_1^{(r)} = \sum_k w(x^*(k)) d_1^{(r)}(x^*(k))$$

or $$X^* = \underset{x}{\operatorname{argmin}} \prod_{k=1}^{K} d_2^{(r)}(x(k))^{w(x(k))}$$

$$D_2^{(r)} = \sum_k d_2^{(r)}(x(k))^{w(x^*(k))}$$

where $X=(x(1), x(2), \ldots, x(K))$, $X^* = (x^*(1), x^*(2), \ldots, x^*(K))$

The recognition result is shown by the following equation.

$$r^* = \underset{r}{\operatorname{argmin}} \left[ (D_1^{(r)}) / \sum_k w(x^*(k)) \right] \quad \text{(Equation 14)}$$

or $$r^* = \underset{r}{\operatorname{argmin}} \left[ (D_2^{(r)})^{1/(w(x^*(1)) + \ldots + w(x^*(K)))} \right]$$

In Equation 13, $x(k)=(t(k),j(k))$ is a k-th lattice point on a matching path X made from Y and $Y^{(r)}$ in a lattice graph $(t,j)$ and $w(x(k))$ is a weighting coefficient on the above-mentioned distance at the lattice point $x(k)$.

Hereinafter, a parallel discussion is established with respect to both multiplication style and addition style, and it is easy to transform addition style into expression in multiplication style $(d_1^{(r)}(t,j)=\log d_2^{(r)}(t,j), D_1^{(r)}=\log D_2^{(r)}$ etc.). However as it is general to use addition style, an explanation is mainly given of addition style here (accordingly, suffixes 1 and 2 are omitted). Multiplication style is indicated only if necessary.

When a point series $x(k_1), \ldots, x(k_2)$ from $x(k_1)$ to $x(k_2)$ is defined as $X(k_1, k_2)$, $x(K)$ is designated as $x(K)=(t(K),j(K))=(T,J)$, Equation 13 signifies that a distance $D^{(r)}$ between Y and $Y^{(r)}$ is defined as a minimum value with respect to $X(1,K)$ of an accumulation of weighted distances between respective feature vectors of an input pattern Y and a reference pattern $Y^{(r)}$ which correspond along a point series $X(1,K)$. The calculation of Equation 13 can efficiently be performed by using the Dynamic Programming method by properly selecting weighting coefficients $w(x(k))$, which is called DP matching.

It is necessary for performing DP to establish the optimality principle. That is, "a partial process of an optimum process is also an optimum process" should be established. In other words, the following recurrent Equation 16 should be established with regard to the following equation 15. Reducing the considerable amount of calculations.

$$\phi(x(k)) = \min_{x(1) \ldots x(k)} \left[ \sum_{n=1}^{k} w(x(n)) d^{(r)}(x(n)) \right] \quad \text{(Equation 15)}$$

$$\phi(x(k)) = \min_{x(k-1)} \left[ \phi(x(k-1)) + w(x(k)) d^{(r)}(x(k)) \right] \quad \text{(Equation 16)}$$

The optimum process from a point $x(1)$ to a point $p_o=x(k)$ is to find a point series (optimum point series) minimizing $\phi'(p_o, X(1,k,))$, when $\phi'(p_o, X(1,k))$ is a weighted accumulation distance along a point series $X(1,k)=(x(1), \ldots, x(a)=p_o)$. When the optimum point series is rendered $X^*(1,k)=(x^*(1), \ldots x^*(k-1), x^*(k)=p_o)$ and $\phi'(p_o, X^*(1,k))$ is rendered $\phi(p_o)$, the above-mentioned optimality principle is established if the optimum point series from the point $x(1)$ to the point x*(k−1) agrees with a point series from a point x*(1) to a point x*(k−1) on the point series X*(1,k). In other words, when a point series minimizing φ(x(k−1))+w(p$_o$)d$^{(r)}$(p$_o$) is rendered (X*(1,k−1) =x*(1), . . . ,x*(k−1)) among optimum point series with x(1) as a start point and x(k−1) as a finish point, a point series up to x(k−1) in the optimum point series from x(1) to x(k)=p$_o$ agrees with X*(1,k−1). Accordingly, when optimum point series from various x(1) as start points to various x(k−1) as finish points are known and accordingly φ(x(k−1)) is known with regard to various x(k−1), the optimum point series from various x(1) to a specific x(k)=p$_o$ and the weighted accumulated distances along the optimum point series can be calculated by Equation 16. That is, the weighted minimum accumulation distance φ(x(k)) from the point x(1) to the point x(k) can be calculated in accordance with Equation 16 by using the weighted minimum accumulation distance φ(x(k−1)) as its successive step, calculating D$^{(r)}$=φ(x(K)) recurrently with φ(x(1))=w(x(1))d$^{(r)}$(x(1)) as an initial value. Therefore, the weighted minimum accumulation distance is calculated with an amount of calculation far less than calculating accumulation distances in all the allowable paths.

Here, examples of weighting coefficients are provided which can establish Equation 16, (1) with respect to a positive integer $1 \leq n < k$: (Equation 17)

$$\sum_{p=1}^{n} w(x(k-p+1)) = t(k) - t(k-n)$$

(2) with respect to a positive integer $1 \leq n < k$:

$$\sum_{p=1}^{n} w(x(k-p+1)) = j(k) - j(k-n)$$

(3) with respect to a positive integer $1 \leq n < k$:

$$\sum_{p=1}^{n} w(x(k-p+1)) = t(k) - t(k-n) + j(k) - j(k-n)$$

That is, when the weighting coefficient is specified by Equation 17 etc., the optimality principle is established and the dynamic programming method is applicable. (1) indicates a case where the total sum of the weighting coefficients is equal to a length of an input pattern (a number of frames), (2) indicates a case where the total sum of the weighting coefficients is equal to a length of a reference pattern and (3) indicates a case where the total sum of the weighting coefficients is equal to a sum of the input pattern length and the reference pattern length.

When example (1) of Equation 17 is used, the following Equation 18 is derived as a specific example of the recursive Equation 16.

$$\phi(t, j) = \min \begin{bmatrix} \phi(t-2, j-1) + d^{(r)}(t-1, j) \\ \phi(t-1, j-1) \\ \phi(t-1, j-2) \end{bmatrix} + d^{(r)}(t, j)$$ (Equation 18)

where $\phi(1, 1) = d^{(r)}(1, 1)$ $D^{(r)} = \phi(x(K)) = \phi(I, J^{(r)})$.

By successively calculating Equation 18 with respect to t=1, . . . T,j=1, . . . ,J, Equation 13, that is, D$^{(r)}$ can be calculated. In this case, paths connectable to x(k) are restricted as shown in FIG. 6 That is, the path up to a point (t,j) passes either of three routes: point (t−2,j−1)→point (t−1,j)→point (t,j), point (t−1,j−1)→point (t,j) and point (t−1,j−1)→point (t,j), wherein a numerical value on each path designates a weighting coefficient each selected path. In this case w(x(1))+ . . . +w)x)K)) is equal to the number of input frames T. Accordingly, in this case the denominator of Equation 14 remains constant irrespective of the reference pattern. Therefore, when a calculation is performed to determine which input pattern is the nearest to which reference pattern, it is not necessary to normalize it by w(x(1))+ . . . +w(x(K)). In this case, as d$^{(r)}$(t,j), a Euclidean distance or a city block distance that is more simplified, or the like, is often used.

In the above-mentioned matching calculation, the distance calculation or the similarity calculation between the feature vectors needs the largest amount of calculation. Especially, when the number of words is increased, the amount of calculation is increased in proportion thereto requiring time and posing a practical problem. A so-called "SPLIT method" using vector quantization has been devised to reduce the burden. (SPLIT: Word Recognition System Using Strings of Phoneme-Like Templates). (Sugamura, Furui, "Speech Recognition of Large Vocabulary Words by Phoneme-Like Reference Pattern", Trans. IEICE, vol. "D", J65-D, no.8, pp 1041–1048 (August, 1982)).

FIG. 7 is a block diagram showing the conventional example. A feature extraction unit 71 is similar to that in FIG. 3. A code book 73 stores representative vectors with M labels in a form searchable by the labels. A quantization unit 74 transforms output feature vectors y$_t$ of the feature extraction unit 71 into labels of clusters having centroids which are the nearest to y$_t$ by using the code book 73. A word dictionary 77 stores reference patterns of word speech to be recognized which have been transformed into a label series by the above-mentioned operation. The label has another name of phoneme-like. When a phoneme-like at a k-th frame of a reference pattern of a word r is defined as s$^{(r)}$k, the word to be recognized in a form shown by the figure is registered in the form of phoneme-like series. J$^{(r)}$ designates a final frame (accordingly, a number of frames) of the reference pattern of the word r. Broken lines in the figure designate connections which are used only in the registering operation of the word to be recognized. A distance matrix calculation unit 72 calculates a distance from each output vector of the feature extraction unit 71 to a centroide of each cluster, transforms it into a vector with the distance as an element and transforms the feature vector series into a distance vector series. That is, a distance matrix. For example, a distance matrix 75 contains y$_t$ which is transformed into a distance vector (d(y$_t$,μ$_1$), d(y$_t$,μ$_2$), . . . ,d(y$_t$, μ$_M$))$^T$ with a distance d(y$_t$, μ$_m$) between the feature vector y$_t$ at a frame t and a centroide μm of a cluster C$_m$(d$_{tm}$ in FIG. 7). The distance is defined by the following equation when a city block distance is used.

$$d(y_t, \mu_m) = \sum_k |y_{tk} - \mu_{tk}|$$ (Equation 19)

where y$_{tk}$ is a k-th element of a vector y$_t$ and μ$_{mk}$ is a k-th element of a centroide vector μ$_m$ of C$_m$. A matching unit 76 matches the distance matrix that is an output of the distance matrix calculation unit 62 with each word of the word dictionary and calculates the distance between them. Specifically, when s$^{(r)}_j$=C$_m$, a distance d$^{(r)}$(t,j) between y$_t$ and s$^{(r)}_j$ is defined by the following equation by which Equation 18 is calculated.

$$d^{(r)}(t,j) = d(y_t, u_m) \quad \text{(Equation 20)}$$

That is, the difference between FIG. 7 and FIG. 5 lies in that $d(y_t, u_m)$ which has previously been calculated in reference to the distance matrix is used in FIG. 7 in place of $d^{(r)}(t,j)$ in the conventional example of FIG. 5. Hence, the calculation can be performed quite similarly by using DP. A determination unit 78 calculates Equation 14 and finally provides a recognition result. In this case the denominator of Equation 14 has the same value as in FIG. 1 and it is not necessary to normalize it since $w(x(1)) + \ldots + w(x(K)) = T$, explained in the embodiment of FIG. 5

In the case of the conventional example of FIG. 5 the calculation of $y_t$ and $y^{(r)}_j$ is increased with an increase in the number of recognition words. However, in the case of the conventional example of FIG. 7 the amount of calculation of $d^{(r)}(t,j)$ remains unchanged irrespective of an increase in words since, once the distance matrix 75 has been calculated, the distance between $y_t$ and a phoneme-like is calculated only by referring to the distance matrix 75.

For example, consider a case where 100 words are recognized with an average of 50 frames for one word and 10 dimensions for a feature vector. In the case of FIG. 5, the number of reference pattern vectors for performing the distance calculation with respect to $y_t$ is on the order of 50×100=5000. When the distance is a Euclidean distance, the number of multiplication operations is provided by multiplying the number of distance calculations with respect to $y_t$ by 10 resulting in 50,000 times. In the case of FIG. 7, the distance calculation is performed with respect to $y_t$ and each centroid vector in a code book. Accordingly, when the number of clusters is M=256, 256 times the distance calculation is sufficient irrespective of the number of recognition words, and the number of multiplication operations is 2560. Note that the latter is $\frac{1}{20}$ the number of operations of the former.

Further, although an explanation has been given here showing that the input feature vector series are transformed into the distance matrix, actually the distance vectors $(d_{t1}, \ldots, d_{tm})^T$ become unnecessary once a comparison thereof with phoneme-likes $s^{(r)}_j (r=1, \ldots, R; j=1, J^{(r)})$ respectively of the reference pattern has been finished. Accordingly, when the calculation of the distance vectors for every frame of input and the calculation of the recurrent equation have been performed with regard to all the reference patterns, $d(y_t, u_j)$ needs not be stored as a matrix. For example, in the case of Equation 18, only the distance vectors for 2 frames of the current frame and the frame immediately before the current frame may be stored. Thereby reducing the amount of required storage.

The above-mentioned FVQ/HMM achieves a recognition rate which is equal to or better than that of the continuous type HMM and the amount of calculation is far smaller than that of the continuous type. However, in performing word spotting, the definition of $\omega_i(y_t)$ cannot be the same as it is in the above-mentioned FVQ/HMM.

Further, although in the above-mentioned SPLIT method a considerably small amount of calculation is required compared with the amount required by a method that directly matches spectra, the problem of causing deterioration in recognition accuracy exists.

SUMMARY OF THE INVENTION

A first embodiment of this application has solved the problem of word spotting, as explained above. A second embodiment relates to an improvement of the above-mentioned SPLIT method which applies the way of thinking of the above-mentioned FVQ to DP matching. A third embodiment relates to reduction in amount of memory storage and in amount of calculation in the above-mentioned HMM and DP. A fourth embodiment further reduces the amount of calculation in recognition time especially in the above-mentioned HMM.

(1) The first embodiment includes: a code book in which a feature vector space is clustered and representative vectors of respective clusters are stored in a form searchable by labels thereof, a cluster occurrence probability storing means for storing occurrence probabilities of the above-mentioned respective labels at the respective states (accordingly, occurrence probabilities of the respective clusters), a membership degree calculating means for calculating membership degrees of observation vectors to the above-mentioned respective clusters by using the code book (posterior probabilities of the above-mentioned respective clusters with respect to the observation vectors) and an observation vector occurrence degree calculating means for calculating product sums of logarithmic values of the calculated membership degrees of the above-mentioned observation vectors to the respective clusters and the occurrence probabilities of the respective clusters stored in the above-mentioned cluster occurrence probability storing means or calculating amounts equivalent to the product sums, and giving the occurrence degrees of the observation vectors in the respective states of the above-mentioned system.

(2) The second embodiment includes: a code book in which a feature vector space is clustered and representative vectors of respective clusters are stored in a form searchable by labels thereof, a membership degree calculating means for calculating membership degrees of observation vectors to the above-mentioned respective clusters or posterior probabilities of the above-mentioned respective clusters with respect tot he above-mentioned observation vectors (hereinafter, both are called membership degree) and calculating membership degree vectors with the membership degrees of the above-mentioned observation vectors with respect to the respective clusters as elements, a reference pattern storing means for storing reference patterns expressed by the membership degree vectors and a matching means for matching input patterns comprising the membership degree vectors transformed from the above-mentioned observation vectors provided as outputs of the above-mentioned membership degree calculating means and the above-mentioned reference patterns.

(3) The third embodiment includes a code book in which a feature vector space is clustered and representative vectors of respective clusters are stored in a form searchable by labels thereof and a cluster occurrence probability storing means or a membership degree reference pattern storing means for storing N of $b_{i,g(i,1)}, b_{i,g(i,2)}, \ldots b_{i,g(i,N)}$ (g(i,n) designates a label of a n-th largest cluster) taken from $b_{i1}, \ldots, b_{iM}$ (ordered by size) or in a form of logarithmic values thereof of $\log b_{i,g(i,1)}, b_{i,g(i,2)}, \ldots, \log b_{i,g(i,N)}$, while storing a constant value for the remaining $b_{i,g(i,N+1)}, \ldots b_{i,g(i,M)}$ where an occurrence probability of a cluster m in a state i of a HMM or a membership degree of a reference pattern vector to the cluster m of a feature vector at the i-th frame is defined as $b_{im}$, and the number of clusters is defined as M.

(4) The fourth embodiment includes: a code book in which a feature vector space is clustered and representative vectors of respective clusters are stored in a form searchable by labels thereof, a cluster occurrence probability storing means for storing occurrence probabilities of the above-mentioned respective labels in respective states (accordingly, occurrence probabilities of the respective clusters), a membership degree calculating means for calculating membership degrees of observation vectors to the above-mentioned respective clusters (posterior probabilities of the above-mentioned respective clusters to the observation vectors) by using the above-mentioned code book, an observation vector occurrence degree calculating means for calculating product sums of the calculated membership degrees of the above-mentioned observation vectors to the respective clusters and logarithmic values of the occurrence probabilities of the respective clusters stored in the above-mentioned cluster occurring probability storing means or calculating amounts equivalent to the product sum and calculating occurrence degrees of the observation vectors in respective states of the above-mentioned system and a means for calculating estimation of the occurrence probabilities of the above-mentioned respective clusters in the above-mentioned respective states by using the above-mentioned observation vector occurrence degree calculating means and calculating the membership degrees of the above-mentioned observation vectors in a recognition time where a maximum membership degree is rendered 1 and all the other membership degrees are rendered 0.

An explanation will be given of the operation of the embodiments in this application as follows.

(1) In the first embodiment, the code book in which the system that is the target of analysis is provided with a plurality of states, the feature vector space is clustered and the representative vectors of the respective clusters are stored in a form searchable by their labels, is prepared. The occurrence probabilities of the above-mentioned respective labels in the respective states (accordingly, the occurrence probabilities of the respective clusters provide that a system that is an object of analysis takes plural states) are stored by the cluster occurrence probability storing means. The membership degrees of the observation vectors to the above-mentioned respective clusters (the posterior probabilities of the above-mentioned respective clusters to the observation vectors) are calculated by using the above-mentioned code book by the membership degree calculating means. The product sums of the logarithmic values of the calculated membership degrees of the above-mentioned observation vectors to the respective clusters and the occurrence probabilities of the respective clusters stored in the above-mentioned cluster occurrence probability storing means (or the amounts equivalent thereto) are calculated by the observation vector occurrence degree calculating means by which the occurrence degrees of the above-mentioned observation vectors in the respective states of the above-mentioned system are calculated.

(2) In the second embodiment, the input signals are transformed into the feature vector series by a feature extraction means. The membership degrees of the respective vectors of the above-mentioned vector series to the respective clusters to which the vectors stored in the cluster storing means are to be classified are calculated by the membership degree calculating means. The membership degree vectors with the membership degrees of the above-mentioned vectors (elements of the respective clusters) are calculated. The reference patterns in which the respective recognition units to be recognized are expressed by the respective membership degree vector series are stored by the reference pattern storing means. Matching is performed between the input patterns comprising the membership degree vector series, provided as the outputs of the above-mentioned membership degree calculating means and the above-mentioned reference patterns, by the matching means.

(3) In the third embodiment, a HMM is provided with the cluster occurrence probability storing means. When the above occurrence probability of the cluster m in the state i is defined as $b_{im}$ and the number of the clusters is defined as M, the cluster occurrence probability storing means stores R of $b_{i,g(i,1)}$, $b_{i,g(i,2)}$, ..., $b_{i,g(i,R)}$ (g(i,r) designates the label of a r-th largest cluster) taken from $b_{i,1} \ldots b_{iM}$ (ordered by size) or in the form of their respective logarithmic values log $b_{i,g(i,1)}$, log $b_{i,g(i,2)}$, ..., log $b_{i,g(i,R)}$ and stores a constant value for the remaining $b_{i,g(i,R+1)}$, ..., $b_{i,g(i,M)}$. A feature extraction means transforms input signals into feature vector series. A cluster storing means stores the clusters to which the above-mentioned vectors are classified. A membership degree calculating means calculates the membership degrees of the respective vectors of the above-mentioned feature vector series to the above-mentioned respective clusters. A feature vector occurrence means calculates occurrence degrees of the above-mentioned feature vectors in the respective states of the above-mentioned HMM from the membership degrees of the above-mentioned feature vectors to the respective clusters and the occurrence probabilities of the above-mentioned respective clusters in the respective states of the above-mentioned HMM A vector series occurrence degree calculating means calculates the occurrence degrees of the above-mentioned feature vector series from the above-mentioned HMM by using the outputs of the above-mentioned feature vector occurrence degree calculating means. The above-mentioned feature vector occurrence degree calculating means calculates the occurrence degrees of the above-mentioned feature vectors in the respective states of the above-mentioned HMM from K clusters having higher orders of the above-mentioned membership degree and the occurrence probabilities of the clusters described in claim 1 corresponding to each of them.

(4) In the fourth embodiment, a code book in which the feature vector space is clustered and the representative vectors of the respective clusters are stored in a form searchable by their labels is prepared. The cluster occurrence probability storing means stores the occurrence probabilities of the above-mentioned respective labels in the respective state (accordingly, the occurrence probabilities of the respective clusters). The membership degree calculating means calculates the membership degrees of the observation vectors in relation to the above-mentioned respective clusters (the posterior probabilities of the above-mentioned respective clusters to the observation vectors) by using the above-mentioned code book. The observation vector occurrence degree calculating means calculates the product sums of the calculated membership degrees of the above-mentioned observation vectors with respect to the respective clusters and the logarithmic values of the occurrence probabilities of the respective clusters stored in the above-mentioned cluster occurrence probability storing means. Alternatively, the observation vector occurrence degree calculating means calculates the amounts equivalent to the product sums and calculates the occurrence degrees of the above-mentioned observation vectors in the respective states of the above-mentioned system. The estimation of the occurrence probabilities of the above-mentioned respective clusters in the above-mentioned respective states is calculated by using the above-mentioned observation vector occurrence degree calculating means. At recognition time, the membership degrees of the above-mentioned observation vectors are calculated such that the maximum membership degree is rendered 1 and all the other membership degrees are rendered 0.

BRIEF DESCRIPTION OF THE FIGURES

FIG. 21 is an explanatory view explaining a method of storing an occurrence probability of a cluster in respective states of HMM according to the present application invention or a membership degree of a feature vector to the cluster in a reference pattern of DP matching according to the present application invention.

FIG. 22 is an explanatory view explaining a method of storing an occurrence probability of a cluster in respective states of HMM according to the present application invention or a membership degree of a feature vector to the cluster in a reference pattern of DP matching according to the present application invention.

FIG. 23 is an explanatory view explaining a method of storing a membership degree of a feature vector to a cluster in an input pattern of HMM according to the present application invention or DP matching according to the present application invention.

FIG. 24 is an explanatory view explaining a method of storing a membership degree of a feature vector to a cluster in an input pattern of HMM according to the present application invention of DP matching according to the present application invention or DP matching according to the present application invention.

DETAILED DESCRIPTION OF THE EXEMPLARY EMBODIMENTS

Figure 1:
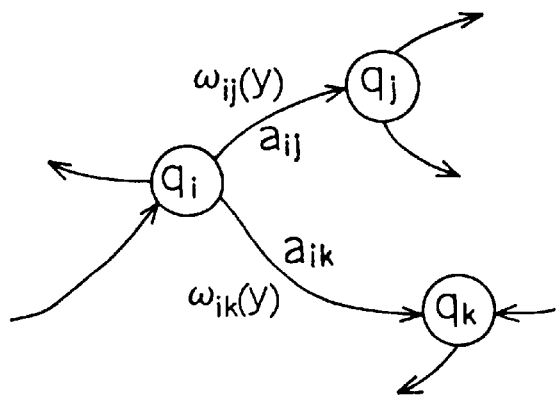
FIG. 1 is an explanatory view of HMM.

An explanation will be given of embodiments of the present invention in reference to the drawings as follows.

Equation 7 is derived from Kullback-Leiber Divergence (hereinafter, KLD) of a distribution $u_t = \{u_{t1}, \ldots, u_{tM}\}$ and a distribution $b_i = \{b_{i1}, \ldots, b_{iM}\}$. (Literature: the Institute of Electronics, Information and Communication Engineers Technical Report (SP93-27 (June, 1993)). That is, defining a separation degree of $u_t$ from $b_i$ as $D(u_t \| b_i)$, KLD is given by the following equation.

$$D(u_t \| b_i) = \sum_{m=1}^{M} u_{tm} \log \frac{u_{tm}}{b_{im}} \qquad \text{(Equation 21)}$$

This signifies a difficulty of occurrence of $u_t$ from a population $b_i$, in other words, a difficulty of occurrence of $u_t$ in a state i. Accordingly, putting $\log \phi_i(y_t) = -D(u_t \| b_i), \phi_i(y_t)$ signifies an ease of occurrence of $u_t$ at a state i which can be used as $\omega_i(y_t)$. Then, Equation 1 can be rewritten as follows by substituting $\phi_i(y_t)$ for $\omega_i(y_t)$.

$$\begin{aligned}
L(Y \mid \lambda) &= \sum_x \pi_{x_1} \prod_{t=1}^{T} a_{x_t x_{t+1}} \prod_{t=1}^{T} \phi_{x_t}(y_t) \\
&= \sum_x \pi_{x_1} \prod_{t=1}^{T} a_{x_t x_{t+1}} \prod_{t=1}^{T} \exp[-D(u_t \| bx_t)] \\
&= \sum_x \pi_{x_1} \prod_{t=1}^{T} a_{x_t x_{t+1}} X \prod_{t=1}^{T} \prod_{m=1}^{M} \left[ \frac{u_{tm}}{b_{im}} \right]^{-u_{tm}} \\
&= \sum_x \pi_{x_1} \prod_{t=1}^{T} a_{x_t x_{t+1}} X \prod_{t=1}^{T} \prod_{m=1}^{M} (b_{im})^{u_{tm}} (u_{tm})^{-u_{tm}} \\
&= \left[ \sum_x \pi_{x_1} \prod_{t=1}^{T} a_{x_t x_{t+1}} \prod_{t=1}^{T} \prod_{m=1}^{M} (b_{im})^{u_{tm}} \right] X \\
&\quad \prod_{t=1}^{T} \prod_{m=1}^{M} (u_{tm})^{-u_{tm}}
\end{aligned} \qquad \text{(Equation 22)}$$

Since the component of the equation specified as follows is a quantity determined only by inputs irrespective of a model, it need not be considered when comparing models by considering the occurrence possibility of an input pattern based on the value of Equation 22.

$$\prod_{t=1}^{T}\prod_{m=1}^{M}(u_{tm})^{-u_{tm}} \quad \text{(Equation 23)}$$

Then, the following equation can newly be defined.

$$L(Y|\lambda) = \sum_{x}\pi_{x_1}\prod_{t=1}^{T}a_{x_t x_{t+1}}\prod_{t=1}^{T}\prod_{m=1}^{M}(b_{im})^{u_{tm}} \quad \text{(Equation 24)}$$

That is, Equation 24 is formed by defining the component as follow in Equation 1.

$$\omega_i(y_t) = \prod_{m=1}^{M}(b_{im})^{u_{tm}} \quad \text{(Equation 25)}$$

Equation 7 can be derived in this manner. This is the principle of the multiplication type FVQ/HMM.

However, the above procedure can be established under the assumption that all the vectors forming an input pattern Y occurs only once and always once with regard to an arbitrary state series X in each of the HMM's. Meanwhile, in case that input pattern is considered to be a connection of vector series in which several models occur, when we search which partial section occurs more from a specific model, we have to think differently. In this case, we define an input pattern frame S (X) which corresponds to an initial state 1 of a state series X, of a model to be compared and we define an input pattern frame E(x) which corresponds to a final state J. In principle the following equation is calculated for all of X.

$$L_x(Y|\lambda) = \left(\left[\pi_{x_{S(x)}}\prod_{t=S(X)}^{E(X)}a_{x_t x_{t+1}}\prod_{t=S(X)}^{E(X)}\omega_{x_t}(y_t)\right]\right)^{\frac{1}{E(X)-S(X)+1}} \quad \text{(Equation 26)}$$

Thereby, the following equation is calculated by which S(X*) through E(X*) can be rendered the partial section of an input speech pattern to be calculated.

$$X^* = \arg\max_{x} \quad \text{(Equation 27)}$$

Figure 2:
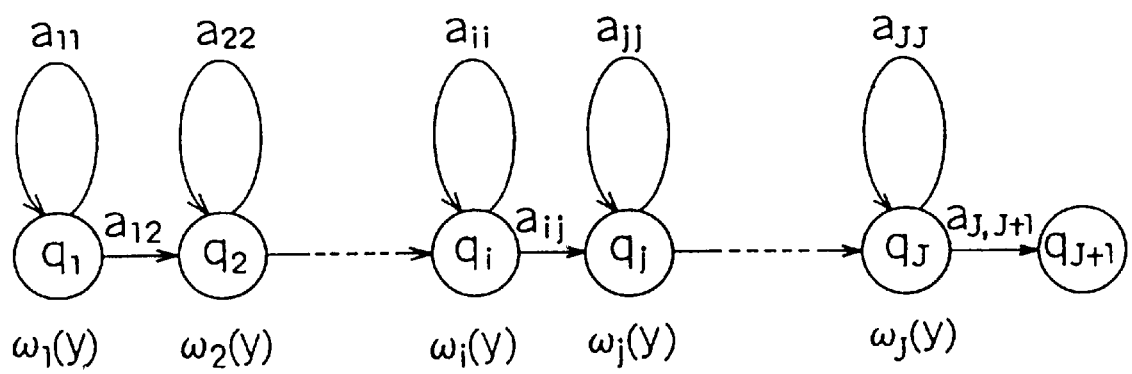
FIG. 2 is a diagram showing an example of HMM that is frequently used in speech recognition.
Figure 3:
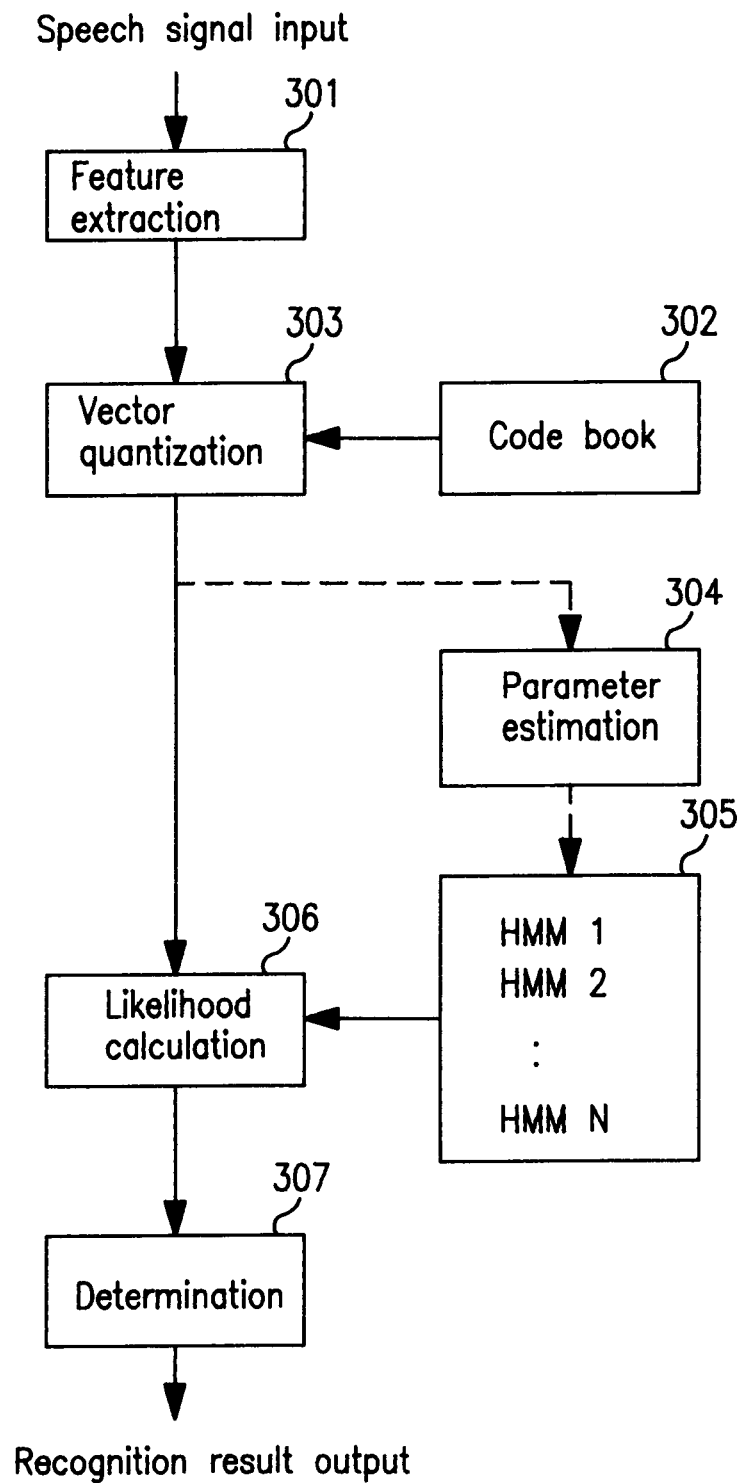
FIG. 3 is a block diagram showing a conventional example of a speech recognition device by a discrete type HMM.
Figure 4:
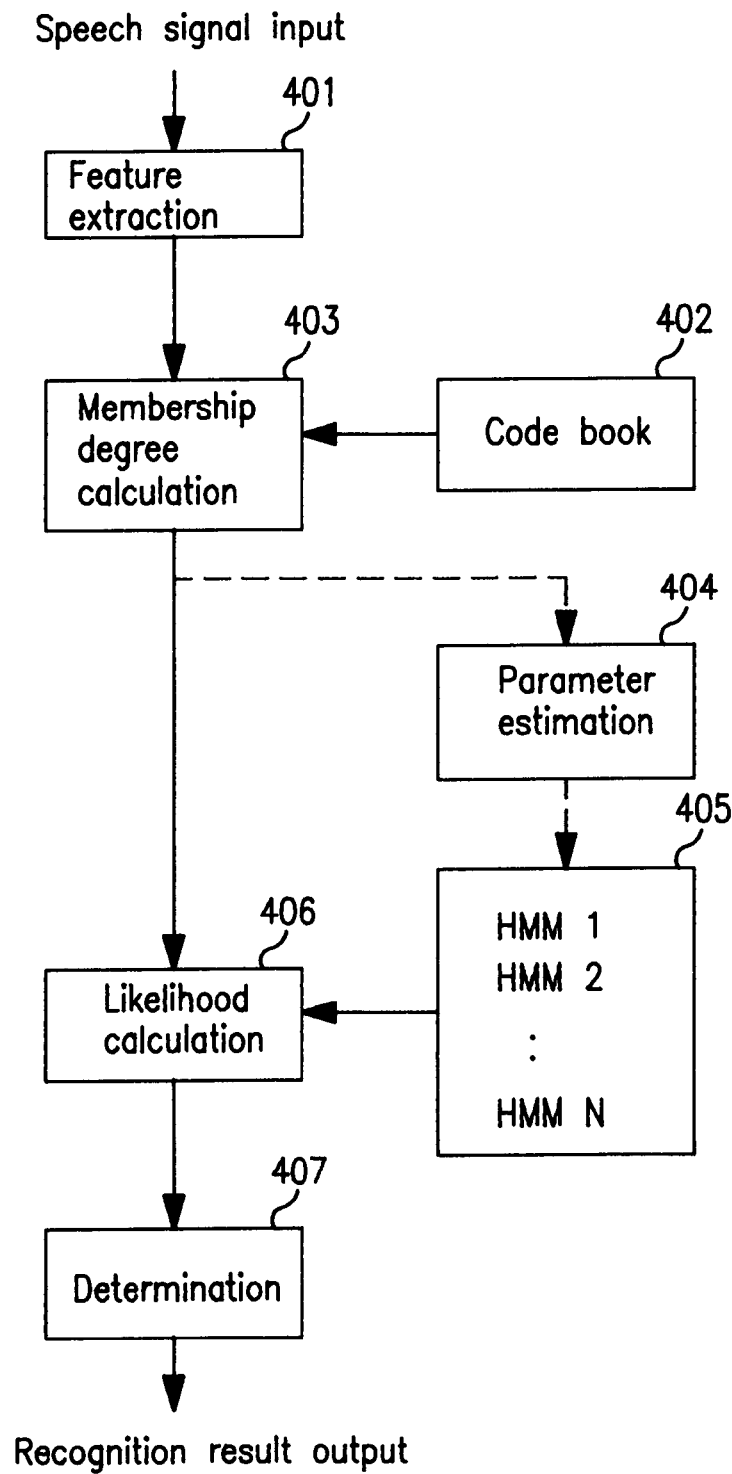
FIG. 4 is a block diagram showing a conventional example and an embodiment of the present application invention of a speech recognition device by HMM based on fuzzy vector quantization.
Figure 8:
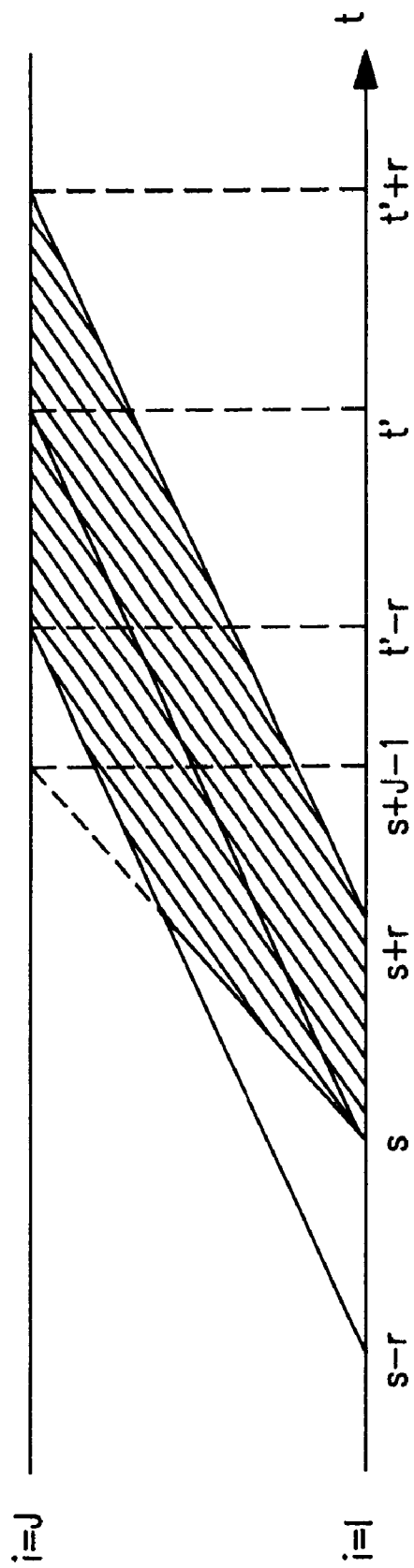
FIG. 8 is an explanatory view of a method of word spotting.

When the calculation is performed, all the combinations of E(X) and S(X) are calculated and the amount of calculation becomes very large. Moreover, in this case Equation 23 depends on X and accordingly, it cannot be omitted. Then, solving the optimum problem of Equation 27 by the Dynamic Programming method is considered. Assuming a frame s as a start-end frame, a finish end frame t is varies in a range of t'±V and degrees of occurrence of input portion patterns $(y_s, \ldots, y_t)$ from HMM $\mu$ are calculated by the Dynamic Programming method. In this case Equation 10 is applicable and an optimum state series maximizing occurrence degree with respect to each of input patterns $(y_s, \ldots y_{t'-v}), \ldots, (y_s, \ldots, y_{t'+v})$ can be provided by the Dynamic Programming method. That is, the finish-end frame t is moved in a pertinent range and an optimum one is selected from the finish ends. Then an optimum finish-end with s as the start-end can be calculated. A predetermined value can be used for the range of the finish-ends from, for example, an average length of vector series generated by the HMM to be compared with the start-end s, or the like can be used. In this case it is necessary to normalize it by t−s+1 every time t is changed. When the same operation is performed by moving s, as a result, optimum start end and finish end, is calculated, which is a desired partial section. In this case it is not necessary to calculate Equation 10 every time t is changed. That is, when a model of FIG. 2 is used, with regard to a certain s, the correspondence of an input feature vector and a state of the HMM is limited to the hatched range of FIG. 8. The range of an input frame m (i) corresponding to a state i in the hatched portion is specified as follows.

$$\min\left\{s+i-1, \frac{t'-s}{J-1}(i-1)+s-v\right\} \le \quad \text{(Equation 28)}$$

$$m(i) \le \frac{t'-s}{J-1}(i-1)+s+v$$

The range of m(i+1) is specified as follows.

$$\min\left\{s+i, \frac{t'-s}{J-1}i+s-v\right\} \le m(i+1) \le \frac{t'-s}{J-1}i+s+v \quad \text{(Equation 29)}$$

Following Equation 10, $\phi_{i+1}$ (m(i+1)) in the range specified by Equation 29 is calculated as a continuation of $\phi_i$ (m(i)) in the range of m(i) specified by Equation 28.

Accordingly, when $\phi_i$ (m(i)) is calculated in the range of Equation 28 for each of $0_i$=1, . . . ,J+1, each of $\phi_{J+1}$ (m(J+1)) provided in a range specified below for i=J+1 becomes each comparison result for the finish-end frame t'±v when the start-end frame of the input pattern is s.

$$\min\left\{s+J, \frac{t'-s}{J-1}J+s-v\right\} \le m(J+1) \le \frac{t'-s}{J-1}J+s+v \quad \text{(Equation 30)}$$

That is, in this way the results for the end frames t'±v with regard to one start-end frame s can be calculated in one operation. However, even with this method the above-mentioned calculation must be performed with respect to the above-mentioned hatched range by changing the start-end at every frame and the amount of calculation is very large. To further reduce the amount of calculation the start-end frame may automatically be determined by the Dynamic Programming method. For that purpose the recursive equation (Equation 10) is manipulated as follows.

Now, define an optimum state series corresponding to $y_s, \ldots, y_t$ as $X^* = x^*_s, x^*_{s+1}, \ldots, x^*_t$. To apply the Dynamic Programming method, when s<m'<t and $x^*_{m'-1}, x^*_{m'}=j$ (j≠i) in X* with respect to an input frame m', the optimum state series to which a partial pattern $y_s, \ldots, y_{m'}$ corresponds must agree with $x^*_s, \ldots, x^*_{m'}$. That is, defining $\phi_j(m')$ as a degree of occurrence of the partial pattern $y_s, \ldots, y_{m'}$ with respect to the state series $x^*_s, \ldots, x^*_{m'}$, z(i) as a section length (frame number) of a state i at the time and $dur_i(z)=dur_i(z(i))$ as a degree of continuing the state i by z frames the following equation is established.

$$\Phi_j(m') = \Phi_i(m'-z(i)) + w_{di}\log dur_i(z(i)) + \quad \text{(Equation 31)}$$

$$w_{ai}\log a_{ij} + \sum_{k=1}^{z(i)}w_{bi}(k)\omega_i(y_{m'-z(i)-1+k})$$

-continued $$\Psi_j(m') = \Psi_i(m' - z(i)') + w_{di'}\log dur_i(z(i)') +$$

$$w_{ai}\log a_{ij} + \sum_{k=1}^{z(i)} w_{bi}(k)'\omega_i(y_{m'-z(i)'-1+k})$$

where j≠i.
Then, the following equation is established.

$$\frac{\Phi_j(m')}{W_i + w_{di} + w_{ai} + \sum_{k=1}^{z(i)} w_{bi}(k)} \geq \frac{\Psi_j(m')}{W_i' + w_{di}' + w_{ai}' + \sum_{k=1}^{z(i)} w_{bi}(k)'}$$ (Equation 32)

When $x^*_{m-1}=j$, $x^*_m=h$ for m specific as m'<m<t, the following equation is established.

$$\xi = \Phi_j(m - z(j)) + w_{dj}\log dur_j(z(j)) +$$ (Equation 33)

$$w_{aj}\log a_{jh} + \sum_{k=1}^{z(j)} w_{bj}(k)\omega_j(y_{m-z(j)-1+k})$$

$$\xi' = \Psi_j(m - z(j)) + w_{dj}\log dur_j(z(j)) +$$

$$w_{aj}\log a_{jh} + \sum_{k=1}^{z(j)} w_{bj}(k)\omega_j(y_{m-z(j)-1+k})$$

where h≠j.
Then, the following equation must be established.

$$\frac{\xi}{W_j + w_{dj} + w_{aj} + \sum_{k=1}^{z(i)} w_{bj}(k)} \geq \frac{\xi'}{W_j' + w_{dj} + w_{aj} + \sum_{k=1}^{z(i)} w_{bj}(k)}$$ (Equation 34)

where $$W_j = W_i + w_{di} + w_{ai} + \sum_{k=1}^{z(i)} w_{bi}(k)$$

$$W_j' = W_i' + w_{di}' + w_{ai}' + \sum_{k=1}^{z(i)} w_{bi}(k)'$$

In the above equations $W_i, W_i', w_{di}, w_{ai}, w_{bi}(k), w_{di'}, w_{ai'}, w_{bi}(k)'(i=1,\ldots,J)$ and the like designate weighting coefficients accompanied by state series or their summations and $\Psi_i(m)$ designates a degree of occurrence of an input partial pattern $y_{s'}, \ldots, y_{m-z(i)}$ corresponding to a state series $x_{s'}, \ldots, x_{m-z(i)}(\neq x^*_{s'}, \ldots, x^*_{m-z(i)})$. $W_i$ designates a total sum of the weighting coefficients along the state series $x^*_{s'}, \ldots, x^*_{m-z(i)}$ and $W_i'$ designates a total sum of the weighting coefficients along the state series $x_{s'}, \ldots, x_{m-z(i)}$. Here, by adequately selecting the weighting coefficients, Equation 31 through Equation 34 can always be established irrespective of the state series. For example, the above conditions are satisfied if clearly, $w_i=w_i', W_{di}'=w_{ai}, w_{bi}(1)'+ \ldots +w_{bi}(z(i))'=w_{bi}(1)+ \ldots +w_{bi}(z(i))$. That is, with regard to a state series which becomes a state i from another state at an input frame m, the sum of weighting coefficients along the state series is made constant irrespective of m, the start-end frame s, and the way of taking the state up to a point (m,i). Substituting numerical values, it is possible to establish $w_{di}=W_{ai}=1, w_{bi}(k)=1/z(i)$ for $i=1, \ldots, J$.

From the above discussion, it is apparent that when the state is changed to j at the input frame t, the degree of occurrence of an optimum partial section up to a point (t,j) can be calculated from the following recursive equation when the number of frames of a partial section of an input corresponding to the state i is defined as z.

$$\Phi_j(t) = \max_{i,z}\left[\Phi_i(t-z) + \log dur_i(z) + \log a_{ij} + \frac{1}{z}\sum_{k=1}^{z}\log\omega_i(y_{t-z-1+k})\right] \text{ where } j \neq i$$ (Equation 35)

In this case i and z satisfy Equation 35 are designated as i*, z*. The following equation is simultaneously stored.

$$B_j(t)=B_{i^*}(t-z^*)$$ (Equation 36)

Then, word spotting can be performed by the following steps.

(1) Initialization $\Phi_1(t)=0$ for $t=1,\ldots,T$ $(\pi_1=1, \pi_i\neq 0 \forall i\neq 1)$ $\Phi_i(0)=-\infty$ for $i=1,\ldots,J$ $B_1(t)=0$ for $t=1,\ldots,T$ (2) Execute (3) and (4) for T=1, . . . ,T+1
(3) Execute Equation 26 and Equation 27 for j=1, . . . ,J+1

(4) $\Phi(t)=\Phi_{J+1}(t)$, $B(t)=B_{J+1}(t-z^*)$
(5) Detect partial patterns
Finish end-frame:

$$t^* = \mathrm{argmax}^{-1}_{t}$$ (Equation 37)

Start end-frame: B(t*)
In this way the calculation of $\Phi_i(t)$ in Equation 35 is performed only once for each (t,j) and with respect to the addition of log $\omega_i(y_{t-z-1+k})$ over k=1 through z. The calculation is not performed at every change of z since, when a sum over k=1 through z(m) is designated as s(m), the sum up to z(m) can be obtained by the calculation of s(m+1)=s(m)+log $\omega_i(y_{t-z+z(m)})$ and accordingly, the amount of calculation is considerably reduced.

Here, in the present invention the following equation is established.

$$\omega_i(y_t) = -\sum_m b_{im}\log\frac{b_{im}}{u_{tm}}$$ (Equation 38)

$$= -\sum_m b_{im}\log b_{im} + \sum_m b_{im}\log u_{tm}$$

Then, the following recursive equation is defined corresponding to Equation 35.

$$\Phi_j(t) = \max_{i,z}\left[\Phi_i(t-z) + \log dur_i(z) + \log a_{ij} + \right.$$ (Equation 39)

-continued $$\frac{1}{z}\sum_{k=1}^{z}\left\{\sum_{m}b_{im}\log u_{t-z-1+k,m} - \sum_{m}b_{im}\log b_{im}\right\}\right]$$

$$= \max_{i,z}[\Phi_i(t-z) + \log dur_i(z) + \log a_{i,j} +$$

$$\frac{1}{z}\sum_{k=1}^{z}\sum_{m}b_{im}\log u_{t-z-1+k,m} - \frac{1}{z}\sum_{k=1}^{z}\sum_{m}b_{im}\log b_{im}$$

$$= \max_{i,z}\left[\Phi_i(t-z) + \log dur_i(z) + \log a_{i,j} - \sum_{m}b_{im}\log b_{im}\right]$$

When the model of FIG. 2 is used, the following equation is established.

$$\Phi_j(t) = \max_{z}\left[\Phi_{j-1}(t-z) + \log dur_{j-1}(z) + \log a_{j-1,j} + \right. \quad \text{(Equation 40)}$$

$$\frac{1}{z}\sum_{k=1}^{z}\sum_{m}b_{j-1,m}\log u_{t-z-1+k,m} - \sum_{m}b_{j-1,m}\log b_{j-1,m}\right]$$

$$= \max_{z}\left[\Phi j - 1(t-z) + \log dur_{j-1}(z) + \right.$$

$$\left.\frac{1}{z}\sum_{k=1}^{z}\sum_{m}b_{j-1,m}\log u_{t-z-1+k}, C_m\right] -$$

$$\sum_{m}b_{j-1,m}\log b_{j-1,m} + \log a_{j-1,j}$$

Now, assuming for simplicity that an optimum state series is calculated and the length of the state i at that time is designed as $z(i)^*$, the following equation is established.

$$F_i = \log dur_i(z(i)^*) + \frac{1}{z(i)^*}\sum_{k=1}^{z(i)^*}\sum_{m}b_{i,m}\log u_{t-z(i)^*-1+k}C_m \quad \text{(Equation 41)}$$

$$G_i = -\sum_{m}b_{j-1,m}\log b_{j-1,m} + \log a_{j-1,j}$$

Then, the following equation is established.

$$\Phi_{J+1}(t) = \Phi_J(t - z(J)^*) + F_J + G_J$$

$$\Phi_J(t - z(J)^*) = \Phi_{J-1}(t - z(J)^* - z(J-1)^*) + F_{J-1} + G_{J-1}$$

$$\ldots$$

$$\Phi_2(t - z(J)^* - \cdots - z(2)^*) = \Phi_1(t - z(J)^* - \cdots - z(1)^*) + F_1 + G_1$$

$$= F_1 + G_1$$

When total sums are calculated for both sides, the following equations are established.

$$\Phi_{J+1}(t) = F_1 + F_2 + \cdots + F_J + G_1 + G_2 + \cdots + G_J \quad \text{(Equation 42)}$$

$$= \sum_{i=1}^{J}\sum_{m=1}^{M}b_{im}\log b_{im} + \sum_{i=1}^{J}\log a_{i,i+1}$$

Accordingly, when the recursive equation of Equation 31 is used, $\Phi_{J+1}(t)$ includes total sums with regard to a state of the final term on the right hand side of the equation and the second term from the final term on the right hand side thereof irrespective of the state series. This is a quantity that is determined when a model to be compared is determined irrespective of the input pattern and is irrelevant to the maximization problem of this equation. Accordingly, this quantity is not necessary in finding the optimum section of the input pattern. Therefore, $\omega_i(y_t)$ redefined by the following equation can be adopted.

$$\omega_i(y_t) = \sum_{m}b_{im}\log u_{tm} \quad \text{(Equation 43)}$$

Figure 7:
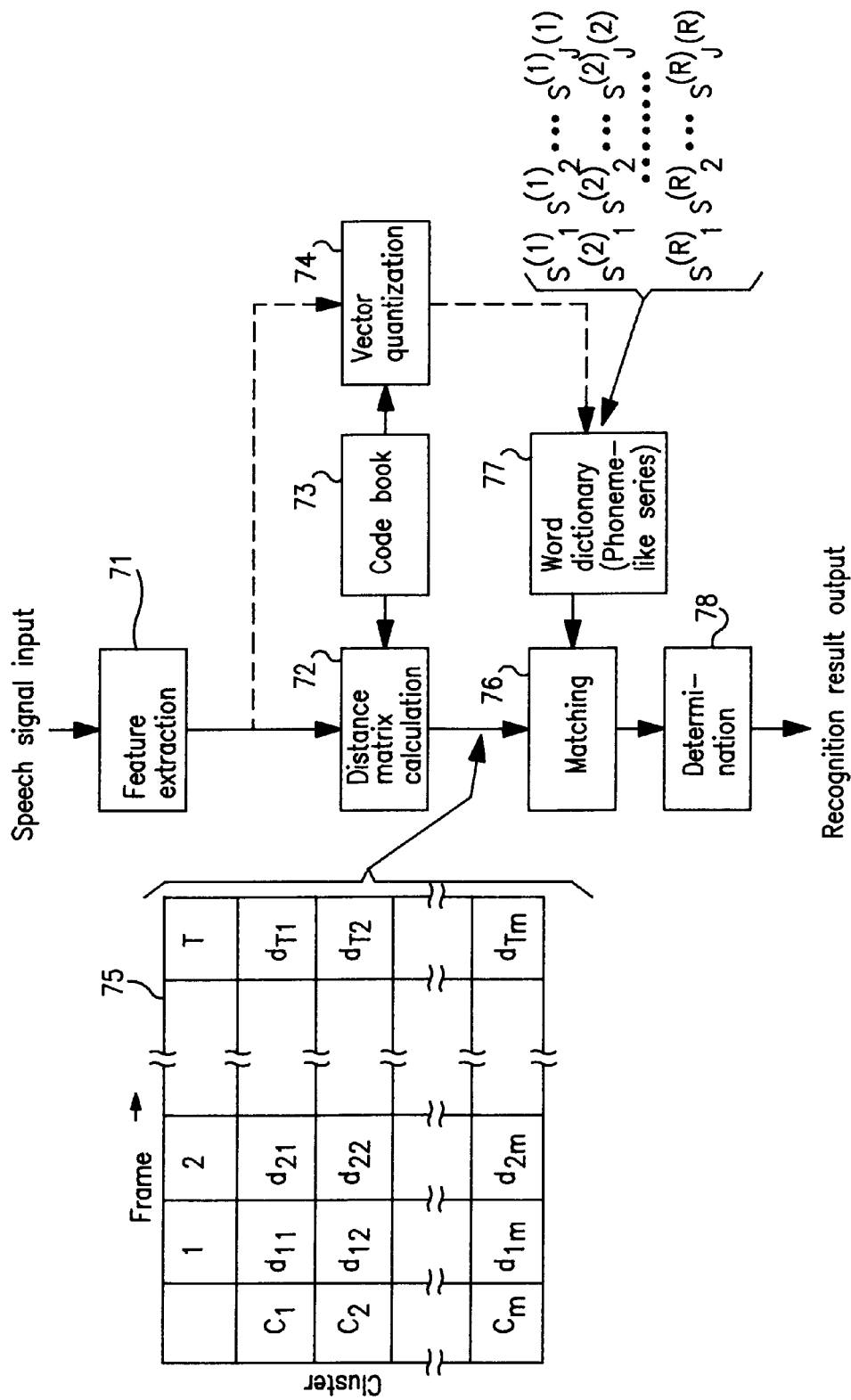
FIG. 7 is a block diagram showing a conventional example of a speech recognition device using vector quantization.
Figure 9:
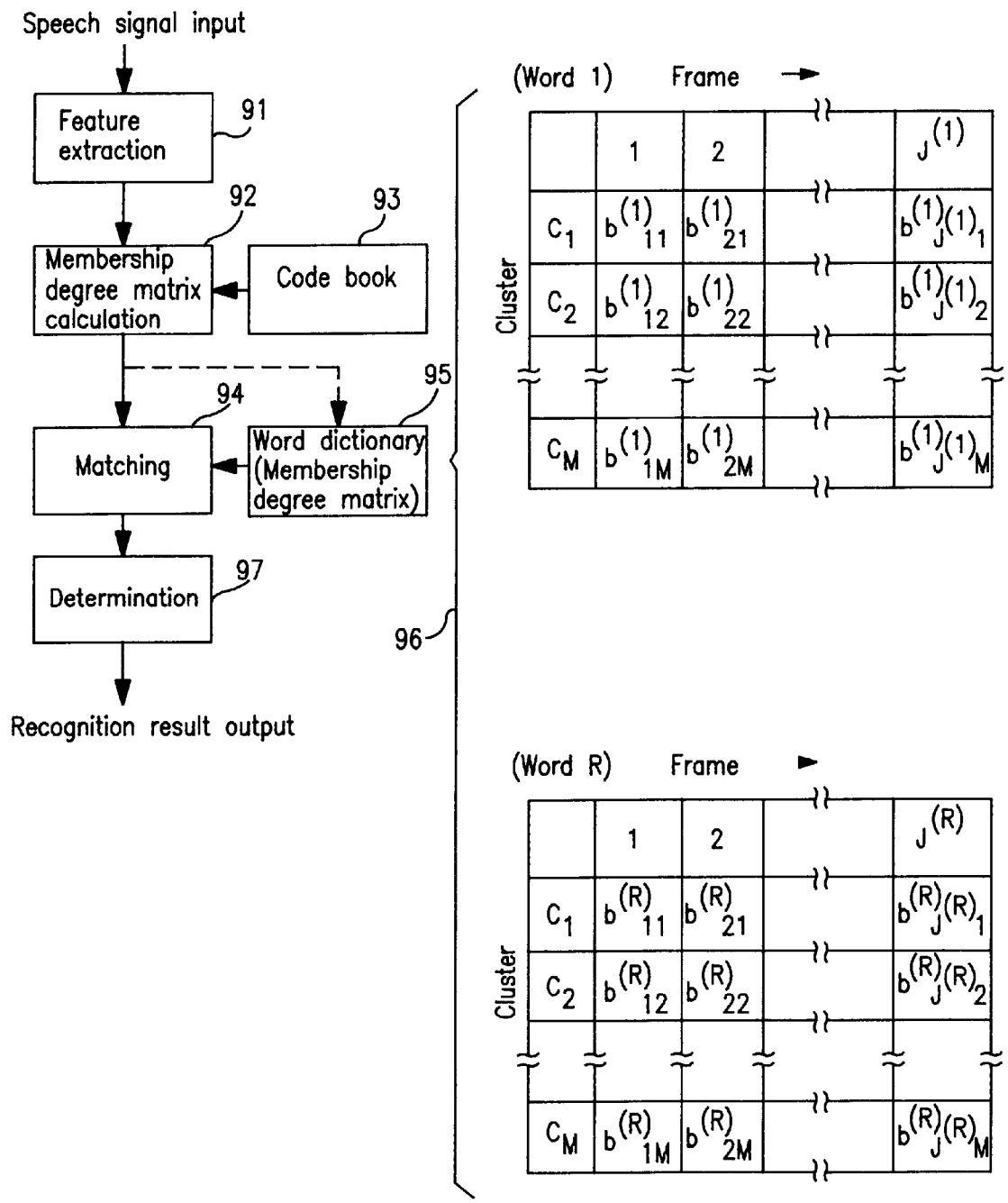
FIG. 9 is a block diagram showing an embodiment of a speech recognition device by DP matching according to the present application invention based on fuzzy vector quantization.

Next, an explanation will be given of a method of applying the above-mentioned FVQ to DP matching which is the second embodiment of the invention of this application. FIG. 9 is a block diagram showing the principle of the present invention. Parts 91 and 93 operate as similarly to parts 71 and 73 in FIG. 7. Numeral 92 designates a membership degree matrix calculation unit corresponding to the distance matrix calculation unit 72 in FIG. 7, which calculates a membership degree matrix in this embodiment. That is, it calculates membership degrees $u_{tm}$(m=1, . . . ,M, $u_{t1}$+ $u_{t2}$+ . . . +$u_{tM}$=1) with respect to a cluster Cm of a feature vector $y_t$. The membership degree can be a membership function or the like used in the fuzzy theory or the like. In this case a similar membership degree to the one used in the above-mentioned FVQ/HMM such as Equation 4 or the like is used. A word dictionary 95 is comprised of membership degree matrices each previously registered in correspondence with each word to be recognized. That is, a reference pattern of the r-th word is registered as a membership degree matrix provided by the membership degree matrix calculation unit 92 with respect to its pronunciation. In FIG. 9 a membership degree in a reference pattern of a word r with respect to a cluster m of a j-th frame is indicated by $b^{(r)}_{jm}$. Numeral 96 designates membership degree matrices for words 1, . . . ,R.

In this case, a similarity degree of a frame t of an input pattern at recognition time and a frame j of a reference pattern r is given as a similarity degree of the membership degree vector $u_t=(u_{t1},u_{t2}, \ldots ,u_{tM})^T$ and $b^{(r)}_j=(b^{(r)}_{j1}, b^{(r)}_{j2}, \ldots ,b^{(r)}_{jM})^T$. Here, $u_{tm} \geq 0, u_{t1}+ \ldots +u_{tM}=1, b^{(r)}_{jm} \geq 0$ and $b^{(r)}_{j1}+ \ldots +b^{(r)}_{jM}=1$, and accordingly, the above-mentioned both vectors can be regarded as probability distribution vectors (when $u_{tm}$ and $b^{(r)}_{jm}$ are posterior probabilities, they are exactly probability distributions per se). Therefore, the above-mentioned similarity degree can be given by Kullback-Leibler Divergence, known to be distances between probability distributions as in the above-mentioned HMM. That is, the separation degree between distributions $(q_1, \ldots ,q_M)$ and $(p_1, \ldots ,p_M)$ can be given by the following equation.

$$0 \leq \sum_{m}q_m \log \frac{q_m}{p_m} \quad \text{(Equation 44)}$$

By using this the following three definitions can be performed as $d^{(r)}(t,j)$ are given.

(1) $$d^{(r)}(t, j) = \sum_{m}u_{tm}\log \frac{u_{tm}}{b^{(r)}_{jm}} \quad \text{(Equation 45)}$$

(2) $$d^{(r)}(t, j) = \sum_{m}b^{(r)}_{jm}\log \frac{b^{(r)}_{jm}}{u_{tm}}$$

$$(3) \quad d^{(r)}(t,j) = \frac{1}{2}\sum_m \left[ u_{tm}\log\frac{u_{tm}}{b^{(r)}_{jm}} + b^{(r)}_{jm}\log\frac{b^{(r)}_{jm}}{u_{tm}} \right]$$

Equation 45(1) defines a distance useful in adopting a weighting coefficient of Equation 17(1), Equation 45(2) defines a distance useful in outputting a weighting coefficient of Equation 17(2) and Equation 45(3) define a distance useful in case where symmetry of distance is a problem. It is possible to use a definition multipled by a constant in case of addition style and a definition powered by a constant in case of multiplication style.

A matching unit 94 performs DP matching between respective membership degree matrices corresponding to respective words registered in the word dictionary 95 and membership degree matrices provided by input patterns. That is, the recursive equation (Equation 18) is calculated based on the inter-frame distance $d^{(r)}(t,j)$ specified by Equation 45, and an accumulation distance $D^{(r)}$ defined by Equation 13(a) is calculated. A determination unit 97 calculates Equation 14 by which a recognition result is provided.

In this way, each feature vector of a feature vector series pronounced to constitute a word dictionary (to be compared) is not replaced by only one phoneme-like but a plurality of phoneme-likes provided with membership degrees and made to correspond to each frame and accordingly. Hence, the adverse influence of quantization error of the conventional example can be alleviated. Further, as is apparent from the above-mentioned explanation, the present invention is characterized by a calculation of membership degrees and a calculation of distances between respective frames of a reference pattern and input frames that are based on mathematically clear definitions.

Next, an explanation will be given of a further improvement to the present invention.

First, an explanation will be given of a case where Equation 45(1) is used as a distance measure.

In this case the inter-frame distance is specified below.

$$d^{(r)}(t,j) = \sum_m u_{tm}\log\frac{u_{tm}}{b^{(r)}_{jm}} \quad \text{(Equation 46)}$$

$$= \sum_m u_{tm}\log u_{tm} - \sum_m u_{tm}\log b^{(r)}_{jm}$$

When this is substituted into Equation 13 with Equation 17(1) as a weighting coefficient, the following equation is established.

$$D^{(r)} = \min_{x(1)\ldots x(K)} \left[ \sum_k w(x(k))d^{(r)}(x(k)) \right] \quad \text{(Equation 47)}$$

$$= \min_{x(1)\ldots x(K)} \left[ \sum_k w(x(k))\sum_m u_{t(k),m}\log u_{t(k),m} - \sum_k w(x(k))\sum_m u_{t(k),m}\log b^{(r)}_{j(k),m} \right]$$

$$= \sum_k w(x(k))\sum_m u_{t(k),m}\log u_{t(k),m} -$$

$$\max_{x(1)\ldots x(K)} \left[ \sum_k w(x(k))\sum_m u_{t(k),m}\log b^{(r)}_{j(k),m} \right]$$

n is specified by $1 \leq n \leq k-1$ establishing $t(k)-t(k-n)=1$ (there is no jump with regard to an input pattern frame in a matching path). When a sum of weighting coefficients along a path from $x(k-n)$ to $x(k)$ is 1, that is, $w(k-n+1)+w(k-n+2)+\ldots+w(k)=1$, for example, in cases as shown by FIGS. 10 through 14, Equation 47 becomes as follows.

$$D^{(r)} = \sum_t\sum_m u_{tm}\log u_{tm} - \quad \text{(Equation 48)}$$

$$\max_{x(1)\ldots x(K)} \left[ \sum_k w(x(k))\sum_m u_{t(k),m}\log b^{(r)}_{j(k),m} \right]$$

Figure 10:
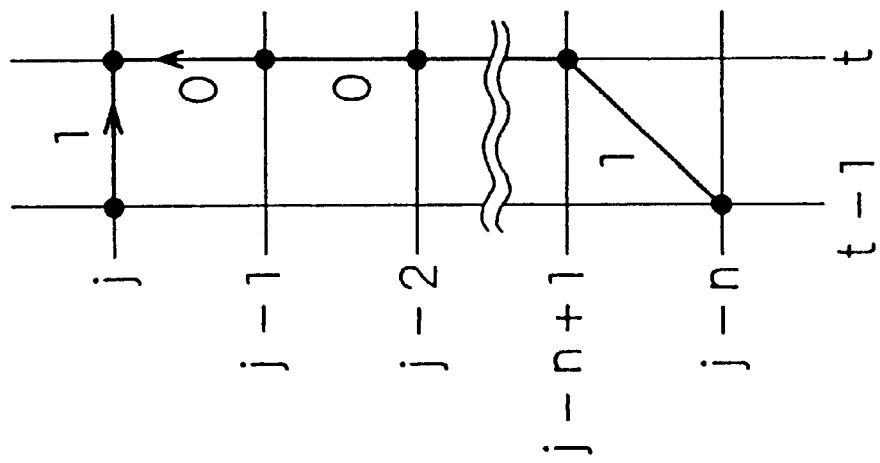
FIG. 10 is an explanatory view showing an example of a restriction condition of matching paths of DP matching of an input pattern axis dependent type.
Figure 11:
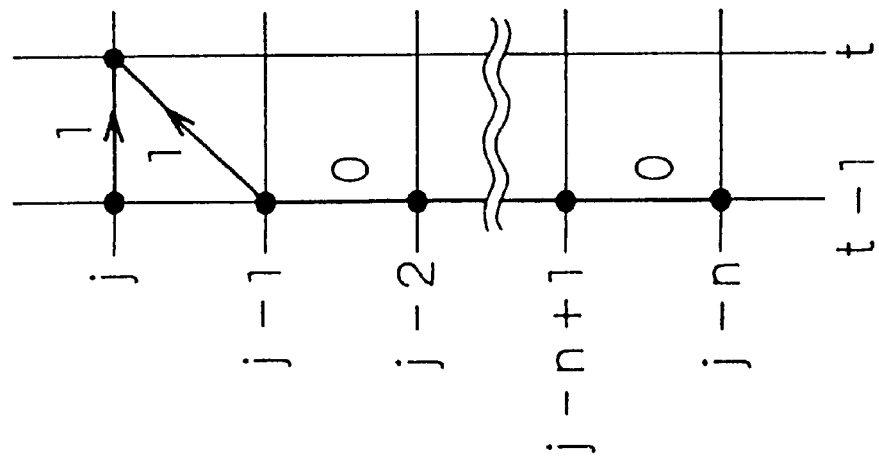
FIG. 11 is an explanatory view showing an example of a restriction condition of matching paths of DP matching of an input pattern axis dependent type.
Figure 12:
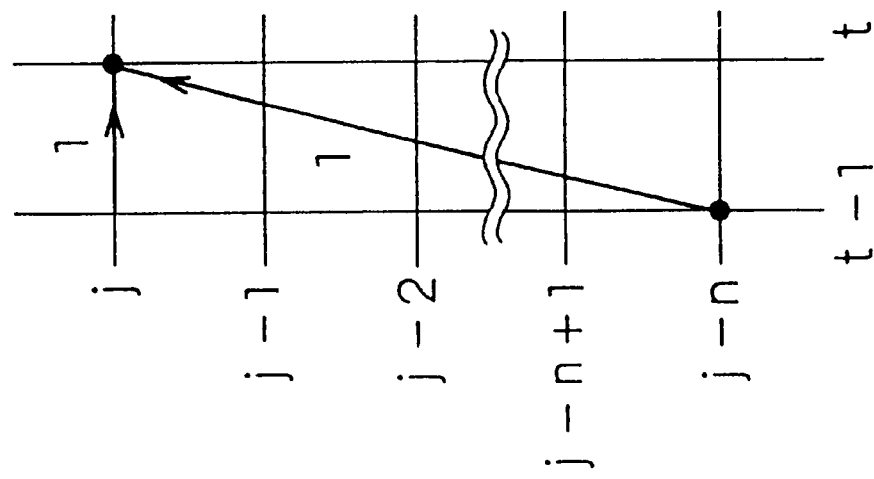
FIG. 12 is an explanatory view showing an example of a restriction condition of matching paths of DP matching of an input pattern axis dependent type.
Figure 13:
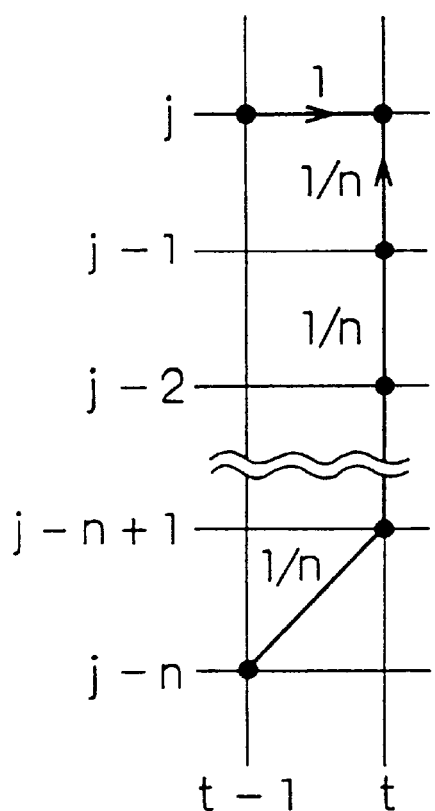
FIG. 13 is an explanatory view showing an example of a restriction condition of matching paths of DP matching of an input pattern axis dependent type.
Figure 14:
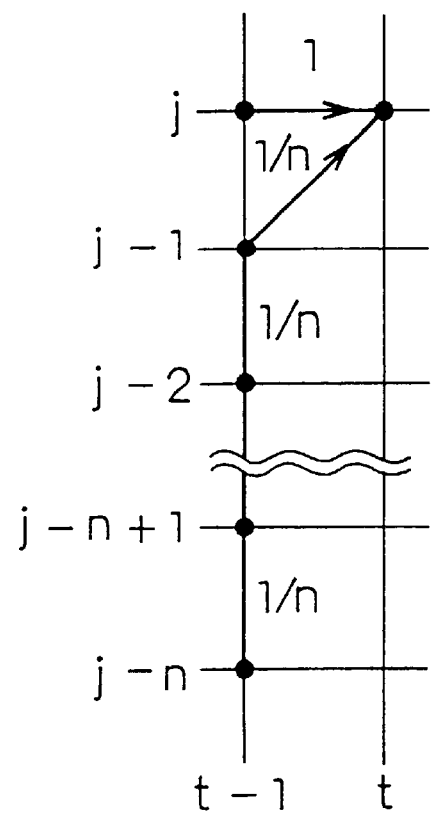
FIG. 14 is an explanatory view showing an example of a restriction condition of matching paths of DP matching of an input pattern axis dependent type.

Examples of FIGS. 10 through 14 show cases for $x(k)=(t,j)$, $k-1 \geq n \geq 1$ wherein in FIG. 10, $x(k-1)=(t-1,j)$ or $(t-1,j-n)$; in FIGS. 11 and 14, $x(k-1)=(t-1,j)$ or $(t-1,j-1)$ and $x(k-n)=(t-1,j-m)$ for $m=2,\ldots,n$; in FIGS. 12 and 13, $x(k-1)=(t-1,j)$, $(t-1,j-1)$ or $(t,j-1)$ and $x(k-m)=(t,j-m)$, $x(k-n)=(t-1,j-n)$ for $m=2,\ldots,n-1$. Numerical values appearing next to paths in respective figures designate an example of weighting coefficients along these paths.

As the first term of the right hand side of Equation 48 is independent from the way of selecting paths and reference patterns, it represents an amount determined only by input patterns. Accordingly, it can be omitted when only large or small comparison results between respective reference patterns and input patterns are a problem. By omitting the term and changing the sign, the following equation can be a similarity degree between patterns.

$$S^{(r)} = \max_{x(1)\ldots x(K)} \left[ \sum_k w(x(k))\sum_m u_{t(k),m}\log b^{(r)}_{j(k),m} \right] \quad \text{(Equation 49)}$$

In this case an inter-frame similarity degree between an input frame t and a frame j of a reference pattern can be defined as follows.

$$s^{(r)}(t,j) = \sum_m u_{tm}\log b^{(r)}_{jm} \quad \text{(Equation 50)}$$

Figure 6:
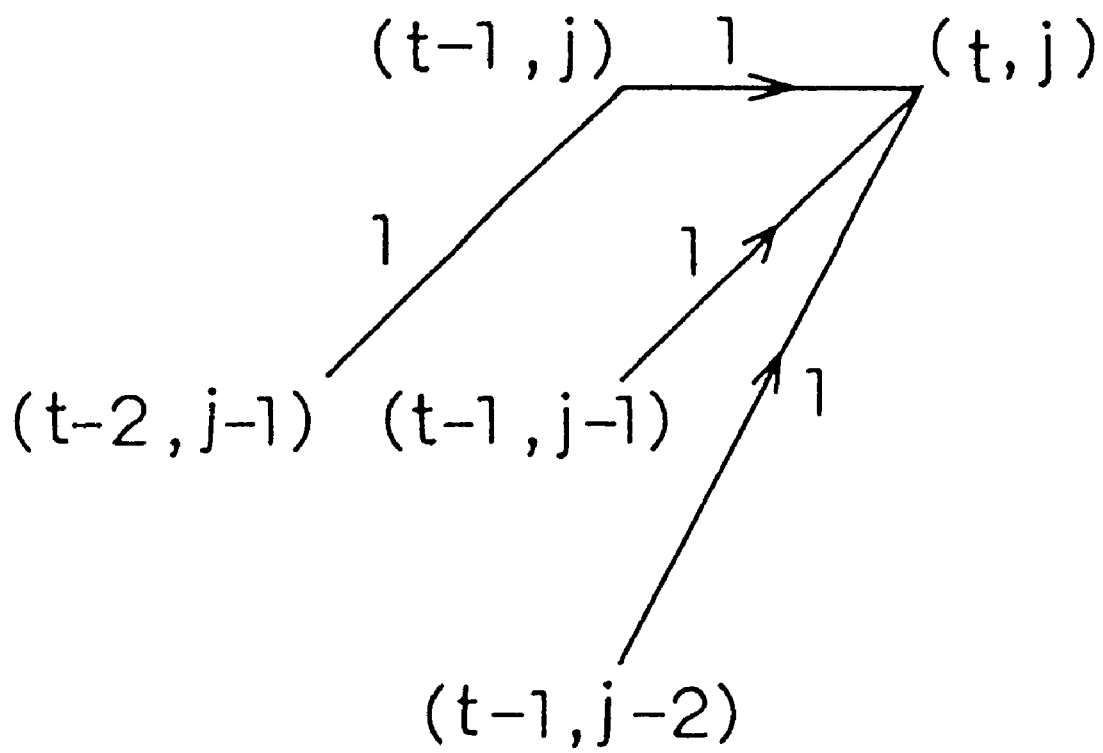
FIG. 6 is an explanatory view showing an example of a restriction condition in matching paths of DP matching of an input pattern axis dependent type.

Here, when $t(k)-t(k-1)=1$ (there is no jump nor duplication with respect to an input pattern frame in matching paths, corresponding to FIG. 6 or FIG. 10), the following equation is established.

$$S^{(r)} = \max_{x(1)\ldots x(K)} \left[ \sum_k\sum_m u_{t(k),m}\log b^{(r)}_{j(k),m} \right] \quad \text{(Equation 51)}$$

$$= \max_{\substack{j=j(t) \\ t=1,2,\ldots,I}} \left[ \sum_t\sum_m u_{tm}\log b^{(r)}_{j(t),m} \right]$$

In the above equation, $j=j(t)$ designates a function showing a matching path in a t–j plane which is provided by eliminating k from $t=t(k)$, $j=j(k)$. When paths in FIG. 6 are used, the matching unit 94 calculates a recursive equation specified below based on the inter-frame similarity degree $s^{(r)}$ (t,j) by which the accumulation similarity degree $S^{(r)}$ defined by Equation 51 is calculated.

$$f(t, j) = \max \begin{bmatrix} f(t-2, j-1) + s^{(r)}(t-1, j) \\ f(t-1, j-1) \\ f(t-1, j-2) \end{bmatrix} + s^{(r)}(t, j) \quad \text{(Equation 52)}$$

where $f(1, 1) = s^{(r)}(1, 1)$ $S^{(r)} = f(x(K)) = f(I, J^{(r)})$

The determination unit 97 calculates the following equation by which a recognition result is provided.

$$r^* = \underset{r}{\operatorname{argmax}}[S^{(r)}] \quad \text{(Equation 53)}$$

The above-mentioned method in which n is specified by $1 \leq n \leq k-1$ establishing $t(k)-t(k-n)=1$ (there is no jump with respect to an input pattern frame in matching paths) a sum of weighting coefficients along paths from $x(k-n)$ to $x(k)$ is 1, that is, $w(k-n+1)+w(k-n+2)+ \ldots +w(k)=1$, is useful in continuous word voice recognition. The reason is that in this way, the problem of finding an optimum connection pattern of individually registered recognition word reference patterns, which is the most similar to an input word voice pattern pronounced continuously, can be calculated effectively by using well-known two-stage DP or the like. The inter-frame similarity degree proposed here is applicable to such a case and can provide a high recognition function by simple calculation.

Next, an explanation will be given of a case in which Equation 45(2) is used as a distance measure.

In this case the inter-frame distance is specified below.

$$d^{(r)}(t, j) = \sum_m b_{jm}^{(r)} \log \frac{b_{jm}^{(r)}}{u_{tm}} \quad \text{(Equation 54)}$$

$$= \sum_m b_{jm}^{(r)} \log b_{jm}^{(r)} - \sum_m b_{jm}^{(r)} \log u_{tm}$$

When this is substituted into Equation 13 with Equation 17(2) as a weighting coefficient, the following equation is established.

$$D^{(r)} = \underset{x(1) \ldots x(K)}{\min}\left[\sum_k w(x(k))d^{(r)}(x(k))\right] \quad \text{(Equation 55)}$$

$$= \underset{x(1) \ldots x(K)}{\min}\left[\sum_k w(x(k))\sum_m b_{j(k),m}^{(r)} \log b_{j(k),m}^{(r)} - \sum_k w(x(k))\sum_m b_{j(k),m}^{(r)} \log u_{t(k),m}\right]$$

$$= \sum_k w(x(k))\sum_m b_{j(k),m}^{(r)} \log b_{j(k),m}^{(r)} - \underset{x(1) \ldots x(K)}{\max}\left[\sum_k w(x(k))\sum_m b_{j(k),m}^{(r)} \log u_{t(k),m}\right]$$

In a case where n is specified by $1 \leq n \leq k-1$ and $j(k)-j(k-n)=1$ (there is no jump with respect to a reference pattern frame in matching paths) a sum of weighting coefficients along paths from $x(k-n)$ to $x(k)$ is equal to 1, that is, $w(k-n+1)+w(k-n+2)+ \ldots +w(k)=1$. For example, in the case of FIGS. 15 through 17, Equation 55 becomes $$D^{(r)} = \sum_j \sum_m b_{jm}^{(r)} \log b_{jm}^{(r)} - \quad \text{(Equation 56)}$$

$$\underset{x(1) \ldots x(K)}{\max}\left[\sum_k w(k)\sum_m b_{j(k),m}^{(r)} \log u_{t(k),m}\right].$$

Figure 15:
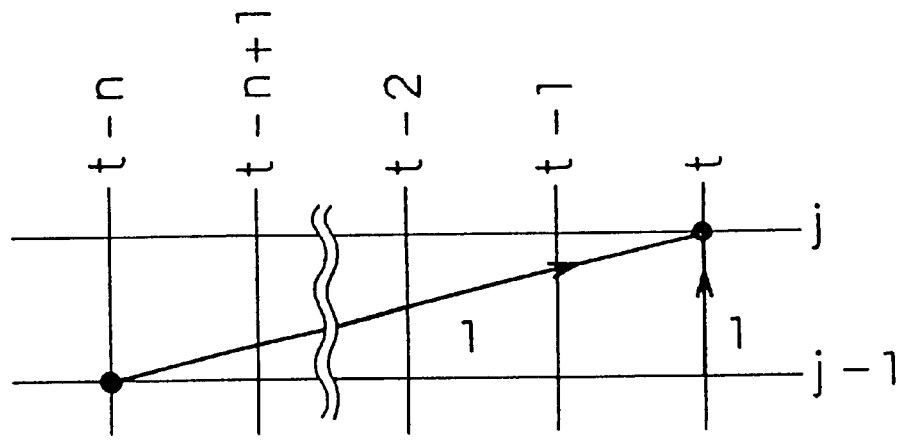
FIG. 15 is an explanatory view showing an example of a restriction condition of matching paths of DP matching of a reference pattern axis dependent type.
Figure 16:
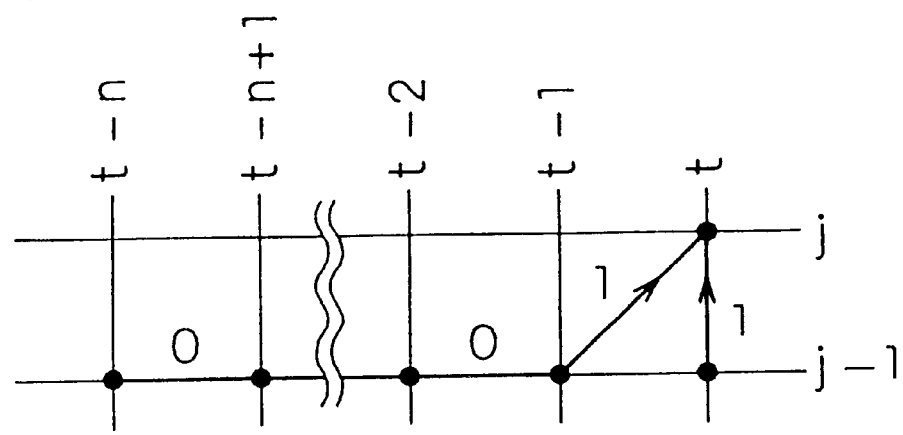
FIG. 16 is an explanatory view showing an example of a restriction condition of matching paths of DP matching of a reference pattern axis dependent type.
Figure 17:
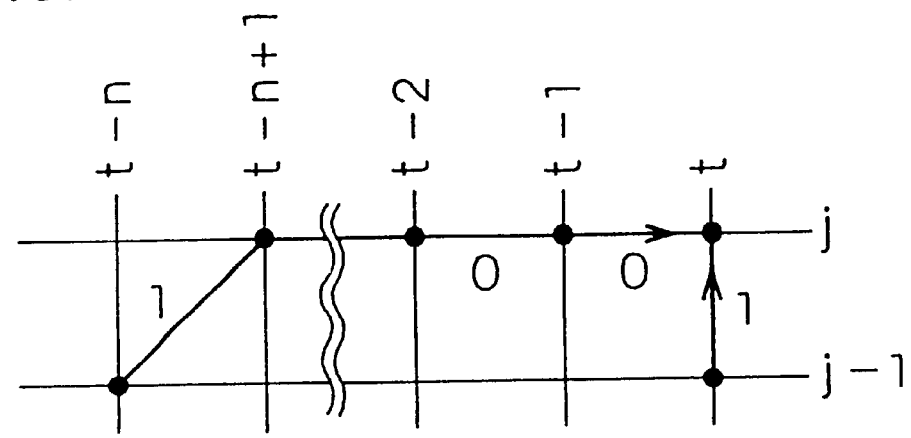
FIG. 17 is an explanatory view showing an example of a restriction condition of matching paths of DP matching of a reference pattern axis dependent type.
Figure 18:
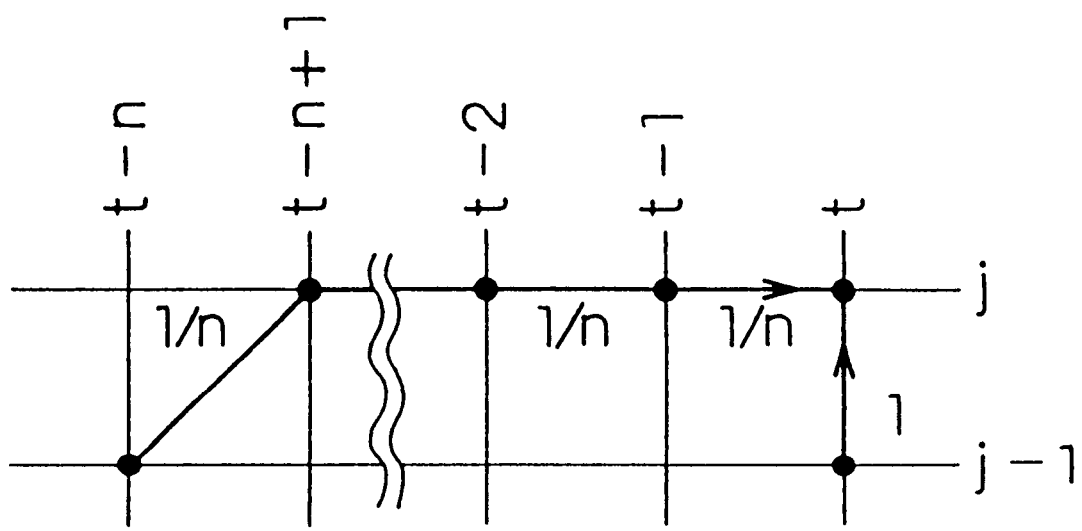
FIG. 18 is an explanatory view showing an example of a restriction condition of matching paths of DP matching of a reference pattern axis dependent type.
Figure 19:
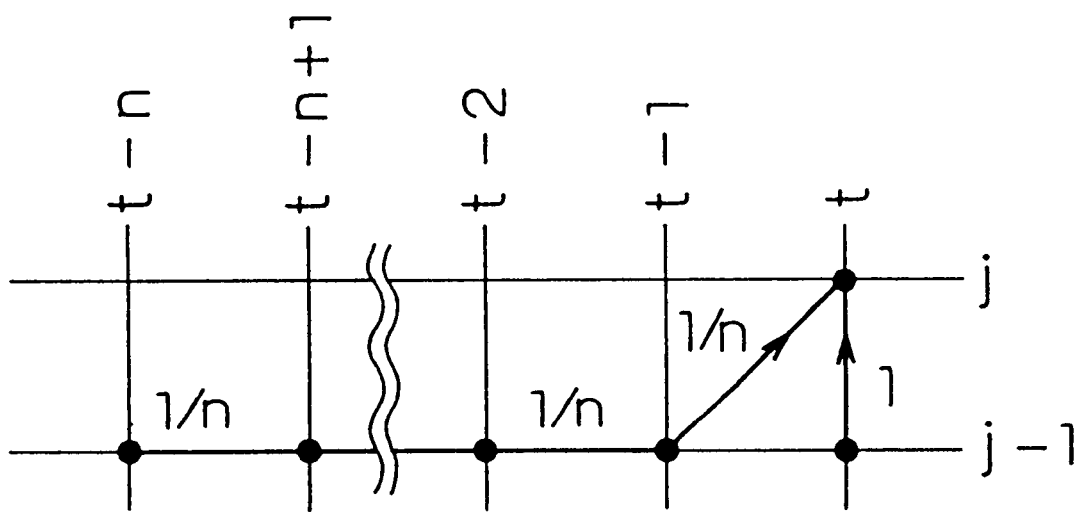
FIG. 19 is an explanatory view showing an example of a restriction condition of matching paths of DP matching of a reference pattern axis dependent type.

Examples of FIGS. 15 through 19 show cases for $x(k)=(t,j)$, $k-1 \geq n \geq 1$ wherein in FIG. 15, $x(k-1)=(t,j-1)$ or $(t-n, j-1)$; in FIGS. 16 and 19, $x(k-1)=(t,j-1)$ or $(t-1,j-1)$, $x(k-m)=(t-m,j-1)$ for $m=2,\ldots,n$ and in FIGS. 17 and 18, $x(k-1)=(t,j-1),(t-1,j-1)$ or $(t-1,j)$ and $x(k-m)=(t-m,j)$, $x(k-n)=(t-n,j-1)$ for $m=2,\ldots n-1$. Numerical values appearing next to paths in the respective figures designate an example of weighting coefficients along the paths in respective cases.

In this case, the first term on the right hand side of Equation 56 is independent from the way of selecting paths and any section of an input pattern and is a quantity determined only by a reference pattern (this quantity with respect to a reference pattern r is designated as $C^{(r)}$). Therefore, it can be omitted only when large or small comparison results between a certain reference pattern and various sections of an input continuous word speech pattern (or various input patterns) are a problem. Therefore, by omitting the term and changing the sign the following equation can be rendered a similarity degree between patterns.

$$S^{(r)} = \underset{x(1) \ldots x(K)}{\max}\left[\sum_k w(x(k))\sum_m b_{j(k),m}^{(r)} \log u_{t(k),m}\right] \quad \text{(Equation 57)}$$

In this case an inter-frame similarity degree between an input frame t and a frame j of a reference pattern r can be specified as follows.

$$S^{(r)}(t, j) = \sum_m b_{jm}^{(r)} \log u_{tm} \quad \text{(Equation 58)}$$

In determining to which reference pattern the input pattern is proximate by using the definition of the inter-frame similarity degree, $(S^{(r)}-C^{(r)})/J^{(r)}$ are compared and the maximum one is found.

Figure 20:
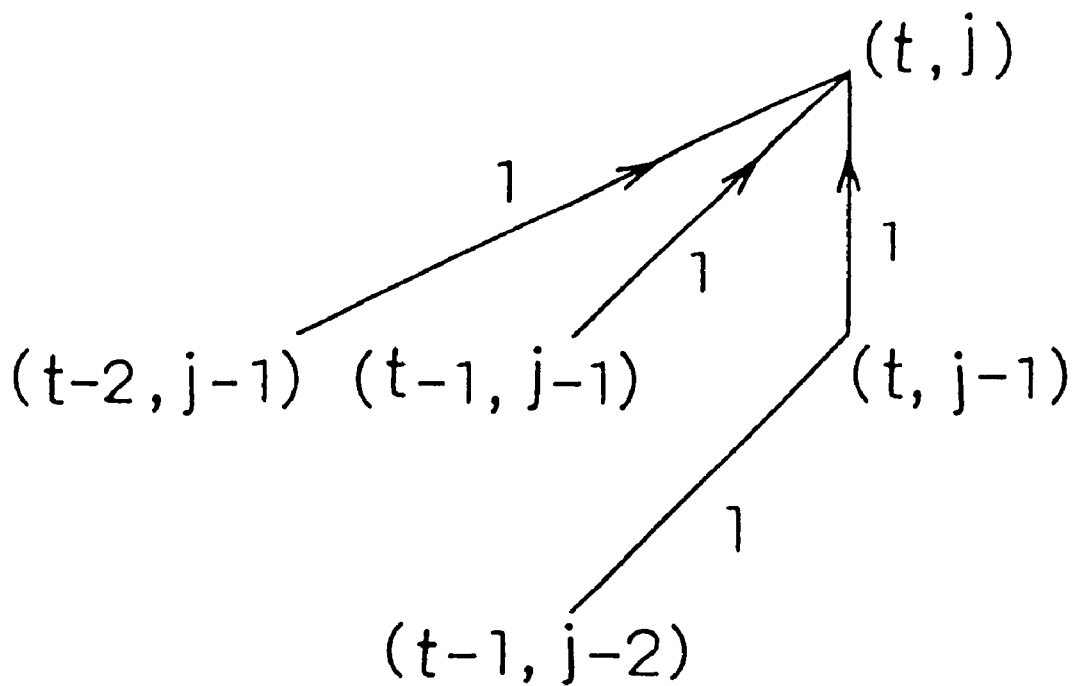
FIG. 20 is an explanatory view showing an example of a restriction condition of matching paths of DP matching of a reference pattern axis dependent type which is frequently used.

Here, when $j(k)-j(k-1)=1$ (there is no jump nor duplication with respect to a reference pattern frame in matching paths, corresponding to FIG. 20 or 15) is further established, the following equation is derived.

$$S^{(r)} = \underset{x(1) \ldots x(K)}{\max}\left[\sum_k \sum_m b_{j(k),m}^{(r)} \log u_{t(k),m}\right] \quad \text{(Equation 59)}$$

$$= \underset{\substack{t(j) \\ j=1,2,\ldots,J}}{\max}\left[\sum_j \sum_m b_{jm}^{(r)} \log u_{t(j),m}\right]$$

In the above equation $t=t(j)$ designates a function indicating a matching path in a t–j plane which is provided by eliminating k from $t=t(k)$ and $j=j(k)$. When the paths in FIGS. 15 through 19 are used, the matching unit 94 calculates a recursive equation specified below based on the inter-frame similarity degree $s^{(r)}(t,j)$, defined by Equation 58, by which the accumulation similarity degree $S^{(r),}$ defined in Equation 59, is calculated.

$$f(t, j) = \max \begin{bmatrix} f(t-2, j-1) \\ f(t-1, j-1) \\ f(t-1, j-2) + s^{(r)}(t, j-1) \end{bmatrix} + s^{(r)}(t, j) \quad \text{(Equation 60)}$$

where $$f(1, 1) = s^{(r)}(1, 1)$$

$$S^{(r)} = f(x(K)) = f(I, J^{(r)})$$

The above-mentioned method in which n is specified $1 \leq n \leq k-1$ establishing $j(k)-j(k-n)=1$ (there is no jump with respect to a reference pattern frame in matching paths) a sum of weighting coefficients along paths from $x(k-n)$ to $x(k)$ is equal to 1. That is, $w(k-n+1)+w(k-n+2)+\ldots+w(k)=1$, a fact that is useful in performing so-called word spotting in which partial sections aligning the most with a certain reference pattern is identified by an input pattern of a continuous word speech produced by continuously pronouncing a word. In this case, only $S^{(r)}$ in respective sections are compared irrespective of lengths of sections of an input pattern when a reference pattern to be compared is designated by r. That is, in this way the problem of word spotting can be solved effectively by applying the Dynamic Programming method using the following steps. The inter-frame similarity degree proposed here is applicable to such a case and can provide high recognition function by simple calculation. For example, word spotting with respect to a certain word is performed by using the path restriction condition of FIG. 20 as follows.

(1) Initialization $f(0,j) = f(-1,j) = -\infty$ for $i = -1, 0, 1, \ldots, J$ $f(0,0) = 0$ (2) Execute (3) through (6) with respect to $t = 1, \ldots, T+1$ (3) $f(t,0) = -\infty$
(4) $f(t,1) = s(t,1)$
(5) $B(t,1) = t-1$
(6) Calculate the following recurring equation with respect $j = 2, \ldots, J$ $$f(t, j) = \max \begin{bmatrix} f(t-2, j-1) + s(t, j) & (1) \\ f(t-1, j-1) + s(t, j) & (2) \\ f(t-1, j-2) + s^{(r)}(t, j-1) + s(t, j) & (3) \end{bmatrix} \quad \text{(Equation 61)}$$

$$B(t, j) = \begin{bmatrix} B(t-2, j-1) & \text{when } f(t, j) = (1) \\ B(t-1, j-1) & \text{when } f(t, j) = (2) \\ B(t-1, j-2) & \text{when } f(t, j) = (3) \end{bmatrix}$$

(7) $D(t) = f(t,J)$, $B(t) = B(t,J)$
(8) Detect partial pattern

Finish end frame:

$$t^* = \underset{t=1,\ldots,T}{\mathrm{argmax}} \quad \text{(Equation 62)}$$

Start end frame: $B(t^*)+1$

Next, an explanation will be given of a method of reducing the amount of memory storage and the computational burden in the above-mentioned HMM and DP; which is the third embodiment of the present invention.

The basic way of thinking is based on storing the membership degree of the reference pattern with respect to only higher order N<M in the case of reducing the storage amount, and calculating the membership degree of the input pattern with respect to only higher order K<M in the case of reducing the computational burden. In this case, attention should be paid so that although $p_i = 0$ for some $i \in \{1, \ldots, M\}$ is possible, $q_i > 0$ for all $\epsilon \{1, \ldots, M\}$, and $q_i$ cannot be 0 in defining the similarity between a probability distribution $(p_1, \ldots, p_M)$ and a probability distribution $(q_1, \ldots, q_M)$ as follows.

$$\sum_i p_i \log q_i \quad \text{(Equation 63)}$$

Accordingly, in the case of calculating or storing only higher order N of $q_i$, with regard to remaining $q_i$, a common value is determined and used such that $q_1 + \ldots + q_M = 1$. Therefore, the amount of storage necessary for $q_i(i=1, \ldots, M)$ in this case is N with regard to $q_{g(1)}, \ldots, q_{g(N)}$ and 1 with regard to $q_{g(1)}, \ldots, q_{g(M)}$. In the above notation, g(n) is a suffix of a n-th largest q among $\{q_1, \ldots, q_M\}$. Although the same treatment can be performed with regard to $p_i$ as with $q_i$ by classifying them into those having higher orders up to K and those having orders of K+1 and lower (K is not necessarily equal to N), these can be 0 and accordingly, it is possible that $P_{h(I)} + P_{h(K)} = 1$, $P_{h(K+1)} + \ldots + P_{h(M)} = 0$ when h(K) is defined as a suffix of a k-th largest p among $\{P_1, \ldots, P_M\}$. In this case the amount of storage necessary for $p_i(i=1, \ldots, M)$ is only K with regard to $P_{h(1)}, \ldots, P_{h(K)}. \omega^{(r)}_i(y_t)$ (specifying that the above-mentioned $\omega_i(y_t)$, $b_{im}$, $a_{ij}$ etc. is related to a word r, is shown by attaching (r) as a superscript) in the above-mentioned multiplication type FVQ/HMM, and all of $s^{(r)}(t,j)$ in the multiplication type FVQ/DP are in the form of Equation 63 and the same is applicable with regard to the above-mentioned reduction in storage amount and computational burden. Therefore, an explanation will be given of embodiments with respect to the multiplication type FVQ/HMM, that is, $\omega^{(r)}_i(y_t)$. In this case, if a state j in a HMM is changed to read a j-th frame in the reference pattern in DP, and the occurrence probability $b^{(r)}_{jm}$ of a cluster m in the state j of a HMM is changed to read the membership degree of the j-th frame of a reference pattern r to a cluster m in DP matching, the same discussion as in the case of the HMM applies also in the case of DP matching.

The following methods are conceivable for reducing respective amounts of storage with regard to $u_{tm}$, $b^{(r)}_{jm}$ as the definition of $\omega^{(r)}(y)$. In the following equation, a suffix g(r,j,n) signifies the name (number) of a cluster in the case where the occurrence probability of the j-th state of a HMM r is of the n-th order, $b^{(r)}_{j,g(r,j,n)}$ signifies the occurrence probability of the cluster g(r,j,n) at the j-th state of HMM r, h(t,k) signifies the name of cluster in the case where the membership degree of the feature vector of a t-th frame of the input pattern is of the k-th order, and $u_{t,h(t,k)}$ signifies the membership degree of $y_t$ to the cluster h(t,k).

(First Method)

$$\omega_j^{(r)}(y_t) = \sum_{n=1}^{N} u_{t,g(r,j,n)} \log b_{j,g(r,j,n)}^{(r)} + \left\{ \sum_{N=N+1}^{M} u_{t,g(r,j,n)} \right\} B_j^{(r)} \quad \text{(Equation 64)}$$

In the above equation, with regard to $b^{(r)}_{j,g(r,j,n)}$ the estimated values for n=1, . . . ,N [in $1 \leq n \leq N$ is as it is] are $b^{(r)}$j.g. (r,j,n) and specified as follows for $N+1 \leq n \leq M$.

$$B_j^{(r)} = \log b_{j,g(r,j,n)}^{(r)} = \log \frac{1}{M-N} \left\{ 1 - \sum_{m=1}^{N} b_{j,g(r,j,n)}^{(r)} \right\} \quad \text{(Equation 65)}$$

$u_{tm}$ may be used for all the estimated values, $1 \leq m \leq M/$ (1.1) or $u_{t,h(t,k)}$ may be estimated as specified below $1 \leq k \leq K$, and $u_{t,h(t,k)}=0$ for $K+1 \leq k \leq M$(1.2).

$$\sum_{k=1}^{K} u_{t,h(t,k)} = 1 \quad \text{(Equation 66)}$$

In the case of (1.2), the reduction in the membership calculation is simultaneously performed (mentioned later).
(Second Method)

$$\omega_j^{(r)}(y_t) = \sum_{n=1}^{N} b_{j,g(r,j,n)}^{(r)} \log u_{t,g(r,j,n)} \quad \text{(Equation 67)}$$

where $b^{(r)}_{j,g(r,j,n)}$ is estimated as specified below for $1 \leq n \leq N$ and $b^{(r)}_{j,g(r,j,n)}=0$ for $N+1 \leq n \leq M$.

$$\sum_{k=1}^{K} b_{j,g(r,j,n)}^{(r)} = 1 \quad \text{(Equation 68)}$$

$u_{t,h(t,k)}$ may be used for all the estimated values of $u_{t,h(t,k)}$ in $1 \leq k \leq M$(2.1) or $u_{t,h(t,k)}$ similar to the above-mentioned are used for $1 \leq k \leq k$ and in $K+1 \leq k \leq M$ the following equation is established (2.2).

$$u_{t,h(t,k)} = \left\{ 1 - \sum_{m=1}^{K} u_{t,h(t,m)} \right\} / (M-K) \quad \text{(Equation 69)}$$

In the case of (2.2) the reduction in the membership degree calculation is simultaneously performed (mentioned later).
(Third Method)

$$\omega_j^{(r)}(y_t) = \sum_{k=1}^{N} b_{j,h(t,k)}^{(r)} \log u_{t,h(t,k)} + \left\{ \sum_{k=K+1}^{M} b_{j,h(t,k)}^{(r)} \right\} C_t \quad \text{(Equation 70)}$$

where with regard to $u_{tm}, u_{t,h(t,k)}$ is the value for k=1, . . . ,K specified below.

$$C_t = \log u_{t,h(t,k)} = \log \frac{1}{M-K} \left\{ 1 - \sum_{m=1}^{K} u_{t,h(t,m)} \right\} \quad \text{(Equation 71)}$$

$b^{(r)}_{j,g(r,j,n)}$ may be used for all the estimated values for n=1, . . . ,M (3.1) or it may be estimated as specified below, setting $b^{(r)}_{j,g(r,j,n)}=0$ for $N+1 \leq n \leq M$.

$$\sum_{n=1}^{N} b_{j,g(r,j,n)}^{(r)} = 1 \quad \text{(Equation 72)}$$

In the case of (3.2) the reduction in the storage amount is simultaneously performed.
(Fourth Method)

$$\omega_j^{(r)}(y_t) = \sum_{k=1}^{K} u_{t,h(t,k)} b_{j,h(t,k)}^{(r)} \quad \text{(Equation 73)}$$

where $u_{t,h(t,k)}$ may be estimated as specified below for $1 \leq k \leq K$ and $u_{t,h(t,k)}=0$ for $K+1 \leq k \leq M$.

$$\sum_{k=1}^{K} u_{t,h(t,k)} = 1 \quad \text{(Equation 74)}$$

$b^{(r)}_{j,g(r,j,n)}$ may be used for all the estimated values, of n in $1 \leq n \leq M$ or $b^{(r)}_{j,g(r,j,n)}$ may be defined as the estimated values for $1 \leq n \leq N$ and as specified below for $N+1 \leq n \leq M$.

$$b_{j,g(r,j,n)}^{(r)} = \left\{ 1 - \sum_{n=1}^{N} b_{j,g(r,j,n)}^{(r)} \right\} / (M-N) \quad \text{(Equation 75)}$$

In the case of (4.2) the reduction in the storage amount is simultaneously performed.

In the first method, the second method, (3.2) of the third method and (4.2) of the fourth method, the occurrence probabilities of the clusters in the respective states of the HMM (or the membership degrees as word reference patterns in DP) are not stored with respect to all the clusters but the labels and the probabilities (membership degrees) of these are stored for the clusters having the probabilities (membership degrees) up to the N-th order among the clusters having high probabilities (membership degrees) with respect to each state of HMM (each frame of the reference patterns of DP). For example, a HMM (reference pattern) with regard to the r-th word is as shown in FIG. 21 or FIG. 22. FIG. 21 can be used in the case of defining the similarity degree by Equation 67 and Equation 70, and FIG. 22 can be used in the case of defining the similarity degree by Equation 64 and Equation 73.

In (1.2) of the first method, (2.2) of the second method, the third method and the fourth method, the membership degree matrix as the input pattern is not calculated with respect to all the clusters but the membership degrees up to the K-th order among the clusters having high membership degrees are calculated with respect to each frame of the input pattern. For example, the input pattern is as shown by FIG. 23 or FIG. 24. FIG. 23 can be used in the case of defining the similarity degree by Equation 64 and Equation 73, and FIG. 24 can be used in the case of defining the similarity degree by Equation 67 and Equation 70.

Figure 5:
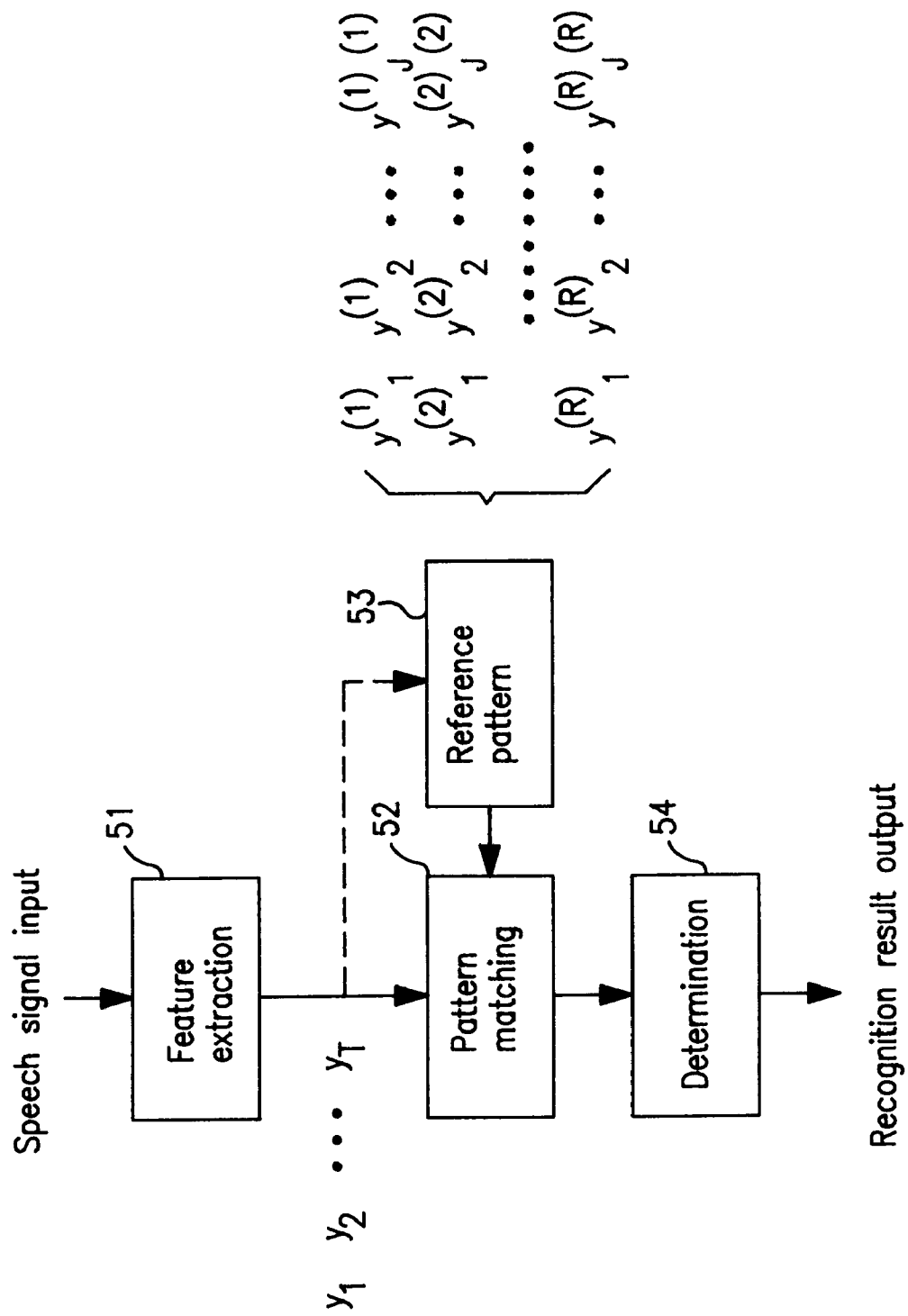
FIG. 5 is a block diagram of a conventional example of a speech recognition device by pattern matching.

In the case of Equation 64, Equation 73, if $\log b^{(r)}_{j,g(r,j,n)}$ is stored as the membership matrix of the reference patterns in place of $b^{(r)}_{j,g(r,j,n)}$ in FIG. 22 (not shown), this calculation may be a product sum calculation. In this case the computational burden is increased more than that in the conventional example of FIG. 7, where, assuming N=3 in Equation 64 and K=3 in Equation 73, the number of multiplication operations is increased by 3 times at each lattice point, and accordingly the number of multiplication operations is 2560+3×50×100=4060. Therefore, the computational burden is certainly increased compared with that in the conventional example 7, but is considerably smaller than that in the case of FIG. 5. Therefore, higher recognition accuracy can be provided than in the conventional example of FIG. 7.

In the case of Equation 67 and Equation 70, if log $u_{t,h(t,k)}$ is stored in place of $u_{t,h(t,k)}$ in FIG. 24 (not shown) as the membership matrix of the input pattern, this calculation may be a product sum calculation. In this case the amount of calculation is increased compared with that in the conventional example of FIG. 7; where assuming N=3 in Equation 67 and K=3 in Equation 70, the number of multiplication operations is increased by 3 times at each lattice point, and accordingly, the number of multiplication operations is 2560+3×50×100=4060. The number of calculations is certainly increased compared with that in the conventional example of FIG. 7, but is considerably less than that in the case of FIG. 5 and resulting in a higher recognition accuracy than that in the conventional example of FIG. 7. In this case, compared with the case of the preceding paragraph where log $b_{im}$ is stored, calculation of log $u_{t,h(t,k)}$ is necessary for each frame of the input pattern. However, if K=3, this is performed only 3 times for each frame and $u_{t,h(t,k)}$ takes only numerical values between 0 and 1. Therefore, if a table of log x, $0 \leq x \leq 1$ is formed, table look-up may be performed in place of the calculation.

If the membership degree is defined by Equation 4 and $u_{t,h(t,1)} + \ldots + u_{t,h(t,K)} = 1$, $u_{t,h(t,K+1)} = \ldots = u_{t,h(t,M)} = 0$, the order of increasing $u_{tm}$ is equal to the order of decreasing $d(y_t,\mu_m)$ and accordingly, firstly, $d(y_t,\mu_m)$ is calculated for all the clusters and the calculation of $u_{tm}$ of higher orders K may be performed with regard to clusters of $d(y_t,\mu_m)$ of lower orders K by which the amount of calculation can be reduced. That is, assume that the following equation is established.

$$D = \frac{1}{\sum_{k=1}^{K} \left(\left[\frac{1}{d(y_t, \mu_{h(t,k)})}\right]\right)^{2/(F-1)}} \quad \text{(Equation 76)}$$

The membership degree for $1 \leq k \leq K$ is given as follows.

$$u_{t,h(t,k)} = \left(\left[\frac{1}{d(y_t, \mu_{h(t,k)})}\right]\right)^{2/(F-1)} D \quad \text{(Equation 77)}$$

In this case, both of the fraction calculation of the denominator in Equation 76 and the calculation of Equation 77 are performed by K times. If M=256, K=3 through 6, the amount of calculation becomes 1/40 through 1/80.

When the membership degree is defined by Equation 4 where $u_{t,h(t,K+1)} = \ldots = u_{t,h(t,M)} = u_{t0}, u_{t,h(t,1)} + \ldots + u_{t,h(t,M)} = 1$, the membership degree in $1 \leq k \leq K$ is calculated by the following Equation 79 by putting D as specified in the following equation 78, $$D = \frac{1}{\sum_{k=1}^{M} \left(\left[\frac{1}{d(y_t, \mu_{h(t,k)})}\right]\right)^{2/(F-1)}} \quad \text{(Equation 78)}$$

(Equation 79)

i) With respect to m∈{h(1), . . . ,h(K)}, the membership degree is defined as $$u_{t,h(t,k)} = \left(\left[\frac{1}{d(y_t, \mu_{h(t,k)})}\right]\right)^{2/(F-1)} D$$

ii) With respect to m∈{h(K+1), . . . ,h(M)}, the membership degree is defined as a common value, $$u_{t0} = \left\{1 - \sum_{m=1}^{K} u_{tm}\right\} / (M - K).$$

M fraction calculations of the denominator of Equation 78 are necessary. As the increasing order of values of $u_{tm}$ is equal to the decreasing order of values of $d(y_t,\mu_m)$, $d(y_t,\mu_m)$ is calculated first for all the clusters and the calculation of $u_{tm}$ in i) of Equation 79 may be performed with regard to clusters of lower orders K of $d(y_t,\mu_m)$.

The following is a method for further simplification. For example, Equation 78 is approximately specified as below by putting $d_{t0} = \{d(y_t,\mu_{h(K+1)})\} + \ldots + d(y_t,\mu_{H(M)})\}/(M-K)$ or $d_{t0} = \{d(y_t,\mu_{h(K+1)}) + d(y_t,\mu_{H(M)})\}/2$, $d_{t0} = \{d(y_t,\mu_{h(K+1)})\} = \ldots = d(y_t,\mu_{(M)}) = d_{t0}$.

$$D = \sum_{k=1}^{K} \left(\left[\frac{1}{d(y_t, \mu_{h(t,k)})}\right]\right)^{2/(F-1)} + \left(\left[\frac{1}{d_{t0}}\right]\right)^{2/(F-1)} (M - K) \quad \text{(Equation 80)}$$

Another possibility is that the membership degree calculating means calculates the membership degrees from distances between the observation vectors and the representative vectors of the respective clusters, where the one having the smallest distance is rendered the first order one. A predetermined constant value of 1/K or less is provided to the clusters of (K+1)-th order or lower by arranging them in order and the calculation is performed with regard to the clusters from 1 to K successively (from the ones having small distances) such that the total sum of the membership degrees becomes 1 from the individual distances and the above-mentioned constant value.

In the case of the multiplication type DP matching, the reference pattern is the membership degree vector series. In the reference pattern, when we register the membership degrees with respect to the clusters having membership degrees of higher orders up to N, we can use the same method applied to the above-mentioned $u_{tm}$. That is, when $b^{(r)}_{j,g(r,j,1)} + \ldots + b^{(r)}_{j,g(r,j,N)} = 1, b^{(r)}_{r,j,N+1} = \ldots = b^{(r)}_{j,g(r,j,M)} = 0$, by putting K→N, h(t,k)→g(r,j,n),$u_{t,h(t,k)}$→$b^{(r)}_{j,g(r,j,n)}$, $b^{(r)}_{jm}$ can be calculated in correspondence with Equation 76 and Equation 77. Similarly, when $b^{(r)}_{j,g(r,j,N+1)} = \ldots = b^{(r)}_{r,j,M)} = b^{(r)}_{j,g(r,j,1)} + \ldots + b^{(r)}_{jm}$ can be calculated in correspondence with Equation 78, Equation 79, Equation 80 or the like.

Next, an explanation will be given of a fourth embodiment of the application. This embodiment is effective in the above-mentioned case of a HMM. The idea comes from the fact that the evaluation of $u_{tm}$ is not influenced theoretically even though there is a difference between the above mentioned K for estimating $b_{im}$ and the above mentioned K for recognition. It is often preferable that the number of calculations is as low as possible in the case of the recognition; setting aside the case of forming a model. The discrete type HMM involves the least number of calculations, which corresponds to the case of recognition putting K=1 in the FVQ/HMM. Accordingly, it is possible that for the purpose of forming a model the method of FVQ/HMM is performed and for purposes of recognition, the recognition is performed by the method of the discrete type HMM. As mentioned above, the FVQ is more effective in alleviating the problem of insufficient number of learning samples in learning parameters of HMMs and increasing estimation accuracy of the parameters, than in reducing the quantizing strain by vector quantization through interpolation. When we form a model by the FVQ type and perform a recognition by the discrete type, the recognition rate capability is little deteriorated compared with the case of using the FVQ type for both forming a model and recognition. However, the improvement in recognition rate in the former case can be verified experimentally when the code book size is large as compared with the case of using the discrete type for both forming a model and recognition.

Further, in case of matching by linear expansion and contraction of time axis comparison of input pattern with reference pattern can be performed based on comparison between above-mentioned membership degree vectors. In the case of the linear expansion and contraction to match the number of frames of a reference pattern with the number of frames of an input pattern, the definition of similarity degree of Equation 7 can be used. In the case of the linear expansion and contraction to match the number of frames of an input pattern with the number of frames of a reference pattern, the definition of similarity of Equation 43 can be used.

In the first embodiment, an HMM device in which word spotting is performed accurately and with a small number of calculations by using a distance measure called Kullbach-Leibler Divergence, is detailed.

In the second embodiment, [the feature vector belongs to a plurality of clusters at rates corresponding to membership degrees with regard to respective clusters or belongs thereto to a plurality of clusters at rates corresponding to posterior probabilities of the respective clusters to the feature vector. Similarity degrees among frames are defined by a distance measure of a probability based on the membership degrees. Therefore, a pattern comparing device which is robust to variation in spectra, where the number of calculations is increased more than that in the conventional case only by a small amount, can be realized.

According to the third embodiment, occurrence probabilities of all the clusters are not stored for each state of the HMM corresponding to each recognition unit but are stored up to the N-th order in the order of probability. One common value is stored for the remaining ones, as they share an equal probability, by which the necessary memory storage is considerably reduced.

According to the fourth embodiment, formation of a model is performed by the multiplication type FVQ/HMM and recognition is performed by the discrete type HMM. Accordingly, estimation error due to insufficiency in the number of learning samples in forming the model are decreased. Thus, a device performing a small number of calculations at recognition time can be realized.

What is claimed:

1. A speech recognition apparatus where a system that is an object of analysis is provided with a plurality of states, comprising:
    a code book in which a feature vector space is clustered and representative vectors of respective clusters are stored in a form searchable by labels thereof;
    cluster occurrence probability storing means for storing occurrence probabilities of the respective labels in the respective states;
    membership degree calculating means for calculating membership degrees of observation vectors to the respective clusters by using the code book; and
    observation vector occurrence degree calculating means for calculating a sum of products of
        (a) the calculated membership degrees of the observation vectors to the respective clusters and
        (b) logarithmic values of the occurrence probabilities of the respective clusters stored in the cluster occurrence probability storing means, or an amount equivalent thereto,
    wherein the sum of products corresponds to occurrence degrees of observation vectors in the respective states of the system, and
    the cluster occurrence probability storing means calculates the occurrence probabilities of the clusters such that, for a predetermined value N, the occurrence probabilities with respect to the clusters in which the occurrence probabilities at an (N+1)-th order or lower are rendered a non-zero common value, and a total sum of the occurrence probabilities of the clusters is 1.

2. The speech recognition apparatus according to claim 1, wherein the membership degree calculating means calculates the membership degrees such that the membership degrees with respect to the clusters in which the membership degrees are at a K+1 order or lower are rendered null and a total sum of the membership degrees is 1.

3. A speech recognition apparatus where a system that is an object of analysis is provided with a plurality of states, comprising a code book in which a feature vector space is clustered and representative vectors of respective clusters are stored in a form searchable by labels thereof, a cluster occurrence probability storing means for storing occurrence probabilities of the respective labels in the respective states, a membership degree calculating means for calculating membership degrees of observation vectors to the respective clusters by using the code book and an observation vector occurrence degree calculating means for calculating a product sum of logarithmic values of the calculated membership degrees of the observation vectors to the respective clusters and the occurrence probabilities of the respective clusters stored in the cluster occurrence probability storing means or an amount equivalent thereto and calculating occurrence degrees of the observation vectors in the respective states of the system.

4. The speech recognition apparatus according to claim 3, wherein the cluster occurrence probability storing means in each state stores the occurrence probabilities calculated such that with regard to a predetermined N a total sum of the probabilities becomes 1 with respect to the clusters having higher orders of up to N with regard to the occurrence probabilities and the occurrence probabilities of other of the clusters are rendered 0.

5. The speech recognition apparatus according to claim 3, wherein the membership degree calculating means calculates the membership degrees of the observation vectors to the respective clusters such that the membership degrees of the clusters having the membership degrees at a K+1 order or lower are rendered a common value that is not null and a total sum of the membership degrees is rendered 1.

6. The speech recognition apparatus according to claim 1 or claim 3, wherein the respective states are respective states of Hideen Markov Model.

7. A speech recognition apparatus according to claim 1, wherein
    estimation of the occurrence probabilities of the respective clusters in the respective states is calculated by using the observation vector occurrence degree calculating means, and at recognition time the membership degrees of the observation vectors are calculated such that a maximum membership degree is rendered 1 and all the other membership degrees are rendered 0.

8. A speech recognition apparatus comprising a cluster storing means in which a feature vector is to be classified, a membership degree calculating means for calculating, with respect to vectors y and z to be compared, a membership degree of each of the vectors to each of the clusters or a posterior probability of each of the clusters to each of the vectors, and calculating membership degree vectors a and b having the membership degrees of the respective vectors to the respective clusters as elements and a similarity degree calculating means for calculating a distance or a similarity degree between the membership degree vectors, wherein the distance or the similarity degree is rendered a distance or a similarity degree of the feature vectors x and y.

9. The speech recognition apparatus according to claim 8 comprising a cluster storing means in which a feature vector is to be classified, a membership degree calculating means for calculating a membership degree of each vector of the vector series to the each cluster and calculating a membership degree vector having a membership degree of the vector to each cluster as an element, a reference pattern storing means expressing a recognition unit to be compared similarly by a membership degree vector series and a matching means for matching an input pattern comprising the membership degree vector series provided as an output of the membership degree calculating means with the reference pattern, wherein as a result of the matching a similarity degree or a distance of the input pattern and the reference pattern is calculated.

10. The speech recognition apparatus according to claim 9, further comprising a similarity degree calculating means for calculating the distance or the similarity degree of corresponding similarity degree vectors by linearly or non-linearly expanding or contracting a time axis of either of the input pattern and the reference pattern or time axes of both thereby aligning the time axes of the both patterns and an accumulated simliarity degree calculating means for calculating the distance or the similarity degree along the time axis of either of the input pattern and the reference pattern or the time axes of both, wherein the accumulation value is rendered the distance or the similarity degree of the input pattern and the reference pattern.

11. The speech recognition apparatus according to claim 9, further comprising a similarity degree calculating means for calculating distance or similarity degrees among membership degree vectors and a dynamic programming means for optimality corresponding each of the membership degree vectors constituting the input pattern with each of the membership degree vectors constituting the reference pattern to be matched with the input pattern such that an accumulation value of the distance or the similarity degrees among corresponded membership degree vectors of the both patterns accumulated along a time axis of either of the input pattern or the reference pattern, and along time axes of the both is minimized or maximized and calculating a maximum or minimum value thereof.

12. The speech recognition apparatus according to claim 8, wherein., when two of the membership degree vectors of which distance or similarity degree is to be calculated are respectively defined as $a=(a_1, \ldots, a_M)$ and $b=(b_1, \ldots, b_M)$, the similarity degree calculating means for calculating the distance or the similarity degree calculates the distance or the similarity degree by either of the following equations or as an amount equivalent thereto.

$$(1) \quad -C\sum_m a_m \log \frac{a_m}{b_m} \quad \text{or} \quad \prod_m (b_m/a_m)^{c_a\, m} \quad \text{(Equation 1)}$$

$$(2) \quad -C\sum_m b_m \log \frac{b_m}{a_m} \quad \text{or} \quad \prod_m (a_m/b_m)^{c_b\, m}$$

$$(3) \quad -C\sum_m \left[a_m \log \frac{a_m}{b_m} + b_m \log \frac{b_m}{a_m}\right]$$

$$\text{or} \quad \left[\prod_m \left[\frac{b_m}{a_m}\right]^{a_m} \left[\frac{a_m}{b_m}\right]^{b_m}\right]^c$$

where C is a constant of C>0.

13. The speech recognition apparatus according to claim 11, wherein, when the membership degree vector corresponding to a frame t of the input pattern is defined as $a_t=(a_{t1}, \ldots, a_{tM})$, the membership degree vector corresponding to a frame j of the reference pattern is defined as $b_j=(b_{j1}, \ldots, b_{jM})$, a k-th (t,j) coordinate on the matching path is defined as x(k)=(t(k),j(k)) and a weighting coefficient at x(k) is defined as w(x(k)), the similarity degree of $a_{t(k)}$ and $b_{j(k)}$ is specified as below, $$s_1(x(k)) = \sum_m a_{t(k),m} \log b_{j(k),m} \quad \text{(Equation 2)}$$

or $$s_2(x(k)) = \prod_m (b_{j(k),m})^{a_{t(k),m}}$$

and an accumulated similarity degree along the path of vector series $a_{t(1)}, \ldots, a_{t(K)}$ and $b_{j(1)}, \ldots, b_{j(K)}$ is specified as below, $$S_1(K) = \max_{x(1), \ldots, x(K)} \left[\sum_k w(x(k)) s_1(x(k))\right] \quad \text{(Equation 3)}$$

or $$S_2(K) = \max_{x(1), \ldots, x(K)} \left[\prod_k s_2(x(k))^{w(x(k))}\right]$$

wherein for $1 \leq n \leq k-1$, if t(k)−t(k−n)=1, w(x(k−n+1))+ . . . +w(x(k))=1.

14. The speech recognition apparatus according to claim 13, wherein the matching path is t(k)−t(k−1)=1 and w(x(k))=1.

15. The speech recognition apparatus according to claim 13, wherein for x(k)=(t,j),k−1≧n≧1, the matching path includes either of (1) x(k−1)=(t−1,j−n) or x(k−1)=(t−1,j), (2) x(k−1)=(t−1,j−1) or x(k−1)=(t−1,j), x(k−m)=(t−1,j−m) for m=2, . . . ,n, (3) x(k−m)=(t,j−m), x(k−n)=(t−1,j−n) for m=1, . . . ,n−1, (4) x(k−m)=(t,j−m), x(k−n)=(t−1,j−n) for m=1, . . . ,n−1 and (5) x(k−1)=(t−1,j−1) or x(k−1)=(t−1,j), x(k−m)=(t−1,j−m) for m=2, . . . ,n and w(x(k))=1 for the path(1), w(x(k))=1,w(x(k−m+1))=0 for the path(2), w(x(K−m+1))=0, w(x(k−n+1))=1 for the path(3) and w(x(k−m+1))=1/n for the paths (4) and (5).

16. The speech recognition apparatus according to claim 11, wherein, when the membership degree vector corresponding to a frame t of the input pattern is defined as $a_t=(a_{t1}, \ldots, a_{tM})$, the membership degree vector corresponding to a frame j of the reference pattern is defined as $b_j=(b_{j1}, \ldots, b_{jM})$, a k-th (t,j) coordinate on the matching path is defined as x(k)=(t(k),j(k)) and a weighting coefficient at x(k) is defined as w(x(k)), the similarity degree calculating means for calculating the distance or the similarity degree specifies the similarity degree of $a_{t(k)}$ and $b_{j(k)}$ as follows, $$s_1(x(k)) = \sum_m b_{j(k),m} \log a_{t(k),m} \quad \text{(Equation 4)}$$

or $$s_2(x(k)) = \prod_m (a_{t(k),m})^{b_{j(k),m}}$$

and the similarity degree of vector series $a_{t(1)}, \ldots, a_{t(K)}$ and $b_{j(1)}, \ldots, b_{j(K)}$ along the path is specified as follows, $$S_1(K) = \max_{x(1),\ldots,x(K)} \left[ \sum_k w(x(k)) s_1(x(k)) \right] \quad \text{(Equation 5)}$$

or $$S_2(K) = \max_{x(1),\ldots,x(K)} \left[ \prod_k s_2(x(k))^{w(x(k))} \right]$$

where for $1 \leq n \leq k-1$, if $j(k)-j(k-n)=1$, $w(x(k-n+1)) + \ldots + w(x(k))=1$.

17. The speech recognition apparatus according to claim 16, wherein the matching path is specified as $j(k)-j(k-1)=1$ and $w(x(k))=1$.

18. The speech recognition apparatus according to claim 16, wherein for $x(k)=(t,j)$, $k-1 \geq n \geq 1$, the matching path includes either of (1) $x(k-1)=(t-n,j-1)$ or $x(k-1)=(t,j-1)$, (2) $x(k-1)=(t-1,j-1)$ or $x(k-1)=(t,j-1)$, $x(k-m)=(t-m,k-1)$ for $m=2,\ldots,n$, (3) $x(k-m)=(t-m,j), x(k-n)=(t-n,j-1)$ for $m=,\ldots,n-1$, (4) $x(k-m)=(t-m,j)$, $x(k-n)=(t-n,j-1)$ for $m=1,\ldots,n-1$ and (5) $x(k-1)=(t-1,j-1)$ or $x(k-1)=(t,j-1)$, $x(k-m)=(t-m,j-1)$ for $m=2,\ldots,n$ and $w(x(k))=1$ for the path(1), $w(x(k))=1$, $w(x(k-m+1))=0$ for the path(2), $w(x(k-m+1))=0$, $w(x(k-n+1))=1$ for the path(3) and $w(x(k-m+1))= 1/n$ for the paths (4) and (5).

19. The speech recognition apparatus according to claim 8, further comprising a reference pattern storing means for storing N of $b_{j,g(j,1)}, b_{j,g(j,2)}, \ldots, b_{j,g(j,N)}$ taken from $b_{j1}, \ldots, b_{jM}$ in an order of largeness (g(j,n) designates a label of a n-th largest cluster in a frame j of a reference pattern, $N \leq M$) as they are and remaining terms having a constant value $b_0$ calculated to establish $b_{j,g(k,1)} + \ldots + b_{j,g(j,N)} + b_0(M-N)=1$ or in the form of respective logarithmic values thereof $\log b_{j,g(j,1)}, \log b_{j,g(j,2)}, \ldots \log b_{j,g(j,M)}$ and $\log b_0$ when the membership degree of a feature vector of the frame j of the reference pattern to a cluster 11 is defined as $b_{jm}$ and a number of the clusters is defined as M.

20. The speech recognition apparatus according to claim 8, wherein, when the membership degree of a feature vector of a frame j of a reference pattern to a cluster m is defined as $b_{jm}$ and a number of clusters is defined as M, N of $b_{j,g(j,1)}, b_{j,g(j,2)}, \ldots, b_{j,g(j,N)}$ taken from $b_{j1}, \ldots, b_{jM}$ in an order of largeness (g(j,n) designates a label of a n-th largest cluster in the frame j of the reference pattern, $N \leq M$) are stored as values calculated to establish $b_{j,g(j,1)} + \ldots + b_{j,g(j,N)}=1$ and remaining terms are stored such that $b_{j,g(j,N+1)} = \ldots = b_{j,g(j,M)} = 0$.

21. The speech recognition apparatus according to claim 8, wherein, when the membership degree of a feature vector $y_t$ at a frame t of an input pattern to a cluster in is defined as $u_{tm}$ and a number of clusters is defined as M, the membership degree vector to which $y_t$ is to be transformed has a value calculated such that K of $u_{t,h(t,1)}, u_{t,h(t,2)}, \ldots, u_{t,h(t,K)}$ taken from $u_{t1}, \ldots, u_{tM}$ in an order of largeness (h(t,k) designates label of a k-th largest cluster at the frame t of the input pattern, $K \leq M$) remain as they are and remaining terms have a constant value of $u_0$ establishing $u_{t,h(t,1)} + \ldots + u_{t,h(t,K)} + u_o(M-K)=1$.

22. The speech recognition apparatus according to claim 8, wherein, when the membership degree of a feature vector $y_t$ at a frame t of an input pattern to a cluster in is defined as $u_{tm}$ and a number of clusters is defined as M, the membership degree vector to which $y_t$ is to be transformed has a value calculated such that K of $u_{t,h(t,1)}, u_{t,h(t,2)}, \ldots, u_{t,h(t,K)}$ taken from $u_{t1}, \ldots, u_{tM}$ in an order of largeness (h(t,k) designates a label of a k-th largest cluster at the frame t of the input pattern, $K \leq M$) have values establishing $u_{t,h(t,1)} + \ldots + u_{t,h(t,K)}=1$ and remaining terns are rendered as $u_{t,h(t,K+1)} = \ldots = u_{t,h(t,M)} = 0$.

23. The speech recognition apparatus according to claim 8, wherein the similarity degree of a t-th frame of an input pattern and a j-th frame of a reference pattern is specified below, $$s_1 = \sum_{n=1}^{N} u_{t,g(j,n)} \log b_{j,g(j,n)} + \left\{ \sum_{N=N+1}^{M} u_{t,g(j,n)} \right\} \log b_0 \quad \text{(Equation 6)}$$

or $$s_2 = \prod_{n=1}^{N} b_{j,g(j,n)}^{u_{t,g(j,n)}} \prod_{n=N+1}^{M} b_0^{u_{t,g(j,n)}}$$

with respect to N of $b_{j,g(j,1)}, b_{j,g(j,2)}, \ldots, b_{j,g(j,N)}$ taken from $b_{j1}, \ldots, b_{jM}$ in an order of largeness (g(j,n) designates a label of a n-th largest cluster at the frame j of the reference pattern, $N \leq M$), a value $b_o$ calculated to establish $b_{j,g(j,1)} + \ldots + b_{j,g(j,N)} + b_o(M-N)=1$ and $u_{tm}$ calculated for all the clusters or K of $u_{t,h(t,1)}, u_{t,h(t,2)}, \ldots, u_{t,h(t,K)}$ calculated to establish $u_{t,h(t,1)} + u_{t,h(t,K)}=1$ in correspondence with an order of largeness among $u_{t1}, \ldots, u_{tM}$ (h(t,k) designates a label of a k-th largest cluster at the frame t of the input pattern, $K \leq M$).

24. The speech recognition apparatus according to claim 8, wherein the similarity degree of a t-th frame of an input pattern and a i-th frame of a reference pattern is specified below, $$s_1 = \sum_{n=1}^{N} b_{j,g(j,n)} \log u_{t,g(j,n)} \quad \text{(Equation 7)}$$

or $$s_2 = \prod_{n=1}^{N} u_{t,g(j,n)}^{b_{j,g(j,n)}}$$

with respect to N of $b_{j,g(j,1)}, b_{j,g(j,2)}, b_{j,g(j,N)}$ calculated to establish $b_{j,g(j,g)} + \ldots + b_{j,g(j,N)}=1$ in correspondence with an order of largeness among $b_{j1}, \ldots, b_{jM}$ (g(j,n) designates a label of a n-th largest cluster at the frame j of the reference pattern, $N \leq M$), $u_{tm}$ calculated for all the clusters or K of $u_{t,h(t,1)}, u_{t,h(t,2)}, \ldots, u_{t,h(t,K)}$ taken from $u_{t1}, \ldots, u_{tm}$ in an order of largeness (h(t,k) designates a label of a k-th largest cluster at the frame t of the input pattern, $K \leq M$) and a value $u_o$ calculated to establish $u_{t,h(t,1)} + \ldots + u_{t,h(t,K)} + u_o(M-K)=1$.

25. The speech recognition apparatus according to claim 8, wherein the similarity degree of a t-th frame of an input pattern and a j-th frame of a reference pattern is specified as follows, $$s_1 = \sum_{k=1}^{K} b_{j,h(t,k)} \log_{t,h(t,k)} + \left\{ \sum_{k=K+1}^{M} b_{j,h(t,k)} \right\} \log u_0 \quad \text{(Equation 8)}$$

or $$s_2 = \prod_{k=1}^{K} u_{t,h(t,k)}^{b_{j,h(t,k)}} \prod_{k=K+1}^{M} u_0^{b_{j,h(t,k)}}$$

with respect to $b_{jm}$ calculated for all the clusters or N of $b_{j,g(j,1)}, b_{j,g(j,2)}, \ldots, b_{j,g(j,N)}$ calculated to establish $b_{j,g(j,1)} + \ldots + b_{j,g(j,N)} = 1$ in correspondence with an order of largeness among $b_{j1}, \ldots, b_{jM}$ (g(j,n) designates a label of a n-th largest cluster at the frame j of the reference pattern, $N \leq M$), K of $u_{t,h(t,1)}, u_{t,h(t,2)}, \ldots, u_{t,h(t,K)}$ taken from $u_{t1}, \ldots, u_{tM}$ in an order of largeness (h(t,k) designates a label of a k-th largest cluster at the frame t of the input pattern, $K \leq M$) and a value $u_o$ calculated to establish $u_{t,h(t,1)} + \ldots + u_{t,h(t,K)} + u_o(M-K) = 1$.

26. The signal recognition apparatus according to claim 1, wherein a similarity degree of a t-th frame of an input pattern and a j-th frame of a reference pattern is specified below, $$s_1 = \sum_{k=1}^{K} u_{t,h(t,k)} \log b_{j,h(t,k)} \quad \text{(Equation 9)}$$

or $$s_2 = \prod_{k=1}^{K} b_{j,h(t,k)}^{u_{t,h(t,k)}}$$

with respect to $b_{jm}$ calculated for all the clusters or N of $b_{j,g(j,1)}, b_{j,g(j,2)}, \ldots, b_{j,g(j,N)}$ taken from $b_{j1}, \ldots, b_{jM}$ in an order of largeness (g(j,n) designates a label of a n-th largest cluster at the frame j of the reference pattern, $N \leq M$), $b_o$ calculated to establish $b_{j,g(j,1)} + \ldots + b_{j,g(j,N)} + b_o(N-M) = 1$ and K of $u_{t,h(t,1)}, u_{t,h(t,2)}, \ldots, u_{t,h(t,K)}$ calculated to establish $u_{t,h(t,1)} + \ldots + u_{t,h(t,K)} = 1$ in correspondence with an order of largeness among $u_{t1}, \ldots, u_{tM}$ (t,K) designates a label of a k-th largest cluster at the frame t of the input pattern, $K \leq M$).

27. The speech recognition apparatus according to claim 5 or claim 19, wherein the membership degrees are calculated from distances of the vectors for calculating the membership degrees and representative vectors of the respective clusters in which the membership degrees are calculated by using the distances as they are with respect to the clusters up to the above-mentioned K in the case of the formed and up to the above-mentioned N in the case of the latter successively from the clusters having smaller distances and by using a common value with respect to the clusters having orders thereof of K+1 or lower or N+1 or lower.

28. The speech recognition apparatus according to claim 27, wherein the common value is an average of the distances for the respective clusters with respect to the clusters having the orders of the above-mentioned K+1 or lower or the above-mentioned N+1 or lower.

29. The speech recognition apparatus according to claim 27, wherein the common value is an average of a minimum distance and a maximum distance with respect to the clusters having the orders of the above-mentioned K+1 or lower or the above-mentioned N+1 or lower.

30. The speech recognition apparatus according to claim 5 or claim 19, wherein the membership degrees are calculated such that the membership degrees are equal to a constant value of a predetermined 1/K or less or 1/N or less with respect to the clusters at a K+1 or lower or a N+1 or lower of an order determined from smaller ones of the distances of the observation vectors for calculating the membership degrees and representative vectors of the respective clusters and the membership degrees are calculated for the clusters K or N successively from the clusters having smaller ones of the distances such that a total sum of the membership degrees become 1 from the respective distances and the constant value.

* * * * *

UNITED STATES PATENT AND TRADEMARK OFFICE
CERTIFICATE OF CORRECTION

PATENT NO. : 6,061,652
DATED : May 9, 2000
INVENTOR(S) : Tsuboka et al.

It is certified that error appears in the above-identified patent and that said Letters Patent is hereby corrected as shown below:

Title page,
Item [57], ABSTRACT, should read -- A Hidden Markov Model (HMM) device, and a Dynamic Programming (DP) matching device, capable of performing word spotting accurately with a small amount of calculation. A code book is used in which a feature vector space is clustered and representative vectors of respective clusters are stored in a form searchable by their labels. In the HMM similarity degrees based on Kullbach-Leibler Divergence of distributions of occurrence probabilities of the clusters under respective states are used. Membership degrees of input feature vectors to be recognized are rendered occurrence degrees of the feature vectors from the states. In DP matching similarity degrees based on Kullbach-Leibler Divergence of distributions of membership degrees of feature vectors are used, forming reference patterns to the respective clusters. Membership degrees of input feature vectors of the respective clusters are rendered inter-frame similarity degrees of frames of the input patterns, and frames of corresponding reference patterns. --.

Column 35,
Line 61, "wherein.," should read -- wherein, --.

Column 37,
Line 49, "11" should read -- m --.
Line 63, after "cluster" insert -- m --, and delete -- in --.

Column 38,
Line 7, after "cluster" insert -- m --, and delete -- in --.

Signed and Sealed this
Twentieth Day of November, 2001

Attest:

NICHOLAS P. GODICI
Attesting Officer       Acting Director of the United States Patent and Trademark Office

UNITED STATES PATENT AND TRADEMARK OFFICE
CERTIFICATE OF CORRECTION

PATENT NO. : 6,061,652
DATED : May 9, 2000
INVENTOR(S) : Tsuboka et al.

It is certified that error appears in the above-identified patent and that said Letters Patent is hereby corrected as shown below:

Column 34,
Lines 26-43, should read -- A speech recognition apparatus where a system that is an object of analysis is provided with a plurality of states, comprising:

a code book in which a feature vector space is clustered and representative vectors of respective clusters are stored in a form searchable by labels thereof;

cluster occurrence probability storing means for storing occurrence probabilities of the respective lables in the respective states;

membership degree calculating means for calculating membership degrees of observation vectors to the respective clusters by using the code book; and observation vector occurrence degree calculating means for calculating a sum of products of (a) logarithmic values of the calculated membership degrees of the observation vectors to the respective clusters and (b) the occurrence probabilities of the respective clusters stored in the cluster occurrence probability storing means or an amount equivalent thereto, wherein the sum of products corresponds to occurrence degrees of the observation vectors in the respective states of the system. --

Column 35,
Lines 5-17, should read -- A speech recognition apparatus comprising:

cluster storing means in which feature vectors are classified;

membership degree calculating means for calculating, with respect to feature vectors y and z to compared, a membership degree of each of the vectors to each of a plurality of clusters, and for calculating membership degree vectors a and b having the membership degrees of the respective vectors to the respective clusters as elements; and

UNITED STATES PATENT AND TRADEMARK OFFICE
CERTIFICATE OF CORRECTION

PATENT NO. : 6,061,652
DATED : May 9, 2000
INVENTOR(S) : Tsuboka et al.

It is certified that error appears in the above-identified patent and that said Letters Patent is hereby corrected as shown below:

similarity degree calculating means for calculating a distance or a similarity degree between the membership degree vectors, wherein the distance or the similarity degree is rendered a distance or a similarity degree of the feature vectors y and z. --

Signed and Sealed this

Thirtieth Day of July, 2002

Attest:

JAMES E. ROGAN
Attesting Officer      Director of the United States Patent and Trademark Office